United States Patent
Li et al.

(10) Patent No.: US 10,631,002 B2
(45) Date of Patent: Apr. 21, 2020

(54) FRAME RATE UP-CONVERSION CODING MODE

(71) Applicant: QUALCOMM Incorporated, San Diego, CA (US)

(72) Inventors: Xiang Li, San Diego, CA (US); Jianle Chen, San Diego, CA (US); Hsiao-Chiang Chuang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 15/719,203

(22) Filed: Sep. 28, 2017

(65) Prior Publication Data

US 2018/0098087 A1    Apr. 5, 2018

Related U.S. Application Data

(60) Provisional application No. 62/403,057, filed on Sep. 30, 2016.

(51) Int. Cl.
*H04N 19/52* (2014.01)
*H04N 19/537* (2014.01)
(Continued)

(52) U.S. Cl.
CPC .......... *H04N 19/52* (2014.11); *H04N 19/105* (2014.11); *H04N 19/117* (2014.11);
(Continued)

(58) Field of Classification Search
CPC .... H04N 19/176; H04N 19/577; H04N 19/70; H04N 19/105; H04N 19/139;
(Continued)

(56) References Cited

U.S. PATENT DOCUMENTS 8,934,054 B2 *  1/2015  Ohno ................. H04N 7/01
                                                 348/441
9,438,910 B1    9/2016  Han et al.
(Continued)

OTHER PUBLICATIONS

Chen J., et al., "Algorithm description of Joint Exploration Test Model 3 (JEM3)", 3, JVET Meeting; May 26, 2016-Jun. 1, 2016; Geneva; (The Joint Video Exploration Team of ISO/IEC JTC1/SC29/WG11 and ITU-T SG.16); URL: http://phenix.int-evry.fr/jvet/,, No. JVET-C1001_v1, Jul. 2, 2016 (Jul. 2, 2016), XP030150223, 38 Pages.
(Continued)

*Primary Examiner* — Neil R Mikeska
(74) *Attorney, Agent, or Firm* — Polsinelli LLP

(57) ABSTRACT

Methods, apparatuses, and computer-readable medium are provided for a frame rate up-conversion coding mode, where a bilateral matching mode can be used to determine motion information. In various implementations, local illumination compensation is disallowed from being used for a block when a bilateral matching mode is used for the block. In various implementations, a bilateral matching mode is disallowed from being used when local illumination compensation is used for the block.

29 Claims, 20 Drawing Sheets

(51) Int. Cl.

| | | |
|---|---|---|
| *H04N 19/147* | (2014.01) | |
| *H04N 19/117* | (2014.01) | |
| *H04N 19/82* | (2014.01) | |
| *H04N 19/132* | (2014.01) | |
| *H04N 19/577* | (2014.01) | |
| *H04N 19/156* | (2014.01) | |
| *H04N 19/176* | (2014.01) | |
| *H04N 19/70* | (2014.01) | |
| *H04N 19/105* | (2014.01) | |
| *H04N 19/139* | (2014.01) | |
| *H04N 19/159* | (2014.01) | |
| *H04N 19/61* | (2014.01) | |
| *H04N 19/56* | (2014.01) | |
| *H04N 19/46* | (2014.01) | |
| *H04N 19/573* | (2014.01) | |

(52) U.S. Cl.
CPC ......... *H04N 19/132* (2014.11); *H04N 19/139* (2014.11); *H04N 19/147* (2014.11); *H04N 19/156* (2014.11); *H04N 19/159* (2014.11); *H04N 19/176* (2014.11); *H04N 19/537* (2014.11); *H04N 19/577* (2014.11); *H04N 19/70* (2014.11); *H04N 19/82* (2014.11); *H04N 19/46* (2014.11); *H04N 19/56* (2014.11); *H04N 19/573* (2014.11); *H04N 19/61* (2014.11)

(58) Field of Classification Search
CPC .. H04N 19/159; H04N 19/147; H04N 19/117; H04N 19/132; H04N 19/156; H04N 19/82; H04N 19/537; H04N 19/52
See application file for complete search history.

(56) References Cited

U.S. PATENT DOCUMENTS

| | | | |
|---|---|---|---|
| 10,187,657 B2* | 1/2019 | Park | H04N 19/597 |
| 2004/0252759 A1 | 12/2004 | John et al. | |
| 2006/0215037 A1 | 9/2006 | Tsunekawa et al. | |
| 2007/0229533 A1 | 10/2007 | Dalal et al. | |
| 2009/0059068 A1* | 3/2009 | Hanaoka | G09G 3/20 348/459 |
| 2009/0122188 A1* | 5/2009 | Hanaoka | G09G 3/3648 348/459 |
| 2010/0002133 A1* | 1/2010 | Ueno | G09G 3/20 348/452 |
| 2010/0039557 A1* | 2/2010 | Mori | G09G 3/20 348/459 |
| 2010/0226435 A1 | 9/2010 | Riemens et al. | |
| 2010/0246675 A1 | 9/2010 | Gharavi-Alkhansari et al. | |
| 2010/0289944 A1* | 11/2010 | Chen | G09G 3/3406 348/441 |
| 2010/0290530 A1 | 11/2010 | Huang et al. | |
| 2010/0315548 A1* | 12/2010 | Suen | G09G 3/3611 348/441 |
| 2011/0294544 A1 | 12/2011 | Liang et al. | |
| 2012/0106645 A1 | 5/2012 | Lin et al. | |
| 2012/0147263 A1 | 6/2012 | Chen et al. | |
| 2013/0136185 A1 | 5/2013 | Tian et al. | |
| 2014/0198988 A1 | 7/2014 | Ihara et al. | |
| 2015/0023422 A1* | 1/2015 | Zhang | H04N 19/51 375/240.16 |
| 2015/0245043 A1 | 8/2015 | Greenebaum et al. | |
| 2015/0271524 A1* | 9/2015 | Zhang | H04N 19/597 375/240.16 |
| 2016/0358584 A1* | 12/2016 | Greenebaum | G09G 5/02 |
| 2017/0188041 A1 | 6/2017 | Li et al. | |
| 2017/0332095 A1 | 11/2017 | Zou et al. | |
| 2018/0098062 A1 | 4/2018 | Li et al. | |
| 2018/0192047 A1 | 7/2018 | Lv et al. | |
| 2018/0270500 A1 | 9/2018 | Li et al. | |

OTHER PUBLICATIONS

International Search Report and Written Opinion—PCT/US2017/054327—ISA/EPO—Jan. 3, 2018.
Liu H., et al., "Local Illumination Compensation", 52, VCEG Meeting, Jun. 19, 2015-Jun. 26, 2015, Warsaw, (Video Coding Experts Group of ITU-T SG.16), No. VCEG-AZ06, Jun. 18, 2015 (Jun. 18, 2015), 4 Pages, XP030003883.
Narroschke M., et al., "Extending HEVC by an Affine Motion Model", 2013 Picture Coding Symposium (PCS), IEEE, Dec. 8, 2013, pp. 321-324, XP032566989, DOI:10.1109/PCS.2013.6737748 [retrieved on Feb. 11, 2014], 4 pages.
Qualcomm: "Harmonization and Improvement for BIO", ITU-T SG16 Meeting; Oct. 12, 2015-Oct. 23, 2015; Geneva, No. T13-SG 16-C-1045, Sep. 30, 2015 (Sep. 30, 2015), 3 Pages, XP030100753.
Rapporteur Q6/16: "Report of Question 6/16 "Visual coding"", ITU-T SG16 Meeting; Oct. 12, 2015-Oct. 23, 2015; Geneva,, No. T13-SG16-151012-TD-WP3-0215R1, Oct. 22, 2015, XP030100764, 24 pages.
Wiegand T., et al., "Description of Core Experiment on Affine Motion Compensation", 9th VCEG Meeting; Red Bank, New Jersey, US; (Video Coding Experts Group of ITU-T SG.16),, No. q15i42, Oct. 13, 1999, XP030003012, 13 pages.
Huawei Technologies: "Affine Transform Prediction for Next Generation Video Coding," ITU-T SG16 Meeting; Oct. 12-23, 2015; Geneva, No. 113-SG16-C-1016, Sep. 29, 2015, XP030100743, 11 pages.
Kamp M-S., "Decoder-Side Motion Vector Derivation for Hybrid Video Coding Zur Erlangung Des Akademischen Grades Eines Doktors Der Ingenieurwissenschaften Genehmigte Dissertation", RWTH Aachen Series on Multimedia and Communications Engineering, Oct. 11, 2011, XP055361986, ISBN: 978-3-8440-0615-5, Retrieved from the Internet: URL:http://www.ient.rwth-aachen.de/services/bib2web/pdf/Ka11.pdf [retrieved on Apr. 5, 2017], 201 pages.
Li L., et al., "An Efficient Four-Parameter Mine Motion Model for Video Coding," Cornell University Library, 201 Olin Library Cornell University Ithaca, NY 14853, Feb. 21, 2017, XP080747890, 14 pages.

* cited by examiner

FRAME RATE UP-CONVERSION CODING MODE

CROSS-REFERENCES TO RELATED APPLICATIONS

This application claims the benefit of and priority to U.S. Provisional Application 62/403,057, filed on Sep. 30, 2016, which is incorporated by reference herein in its entirety.

FIELD

This application is related to video coding and compression. For example, systems and methods are described for improving frame rate up-conversion (FRUC).

BACKGROUND

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), and High Efficiency Video Coding (HEVC) or ITU-T H.265. In 2016, MPEG and ITU-T VCEG formed a joint exploration video team (JVET) to explore new coding tools for the next generation of video coding standards. The reference software is called JEM (joint exploration model).

BRIEF SUMMARY

Frame rate up-conversion (FRUC) techniques can be used to generate high-frame rate videos from low-frame rate videos. One method for frame rate up-conversion that produces good results is bilateral matching. Application of local illumination compensation, in conjunction with bilateral matching can, however, increase computation complexity without producing any gains in terms of reducing the bitstream size.

Frame rate up-conversion techniques can use translational motion when determining where to place a block in an up-converted frame. Objection motion, however, may not be strictly linear, and can include rotation, zooming in or zooming out, and other non-linear motion. In these situations, an affine motion model may produce a more compact bitstream than if a translational motion model is applied.

According to at least one example, a method of processing video data is provided that includes obtaining the video data. The method further includes using frame rate up-conversion bilateral matching coding mode for a block of the video data, where local illumination compensation is disallowed from being used for the block when the frame rate up-conversion bilateral matching coding mode is used for the block. The method further includes determining motion information for the block, where the motion information is determined based on the frame rate up-conversion bilateral matching coding mode used for the block.

In another example, an apparatus is provided that includes a memory configured to store video data and a processor. The processor is configured to and can obtain the video data. The processor is configured to and can use frame rate up-conversion bilateral matching coding mode for a block of the video data, where local illumination compensation is disallowed from being used for the block when the frame rate up-conversion bilateral matching coding mode is used for the block. The processor is configured to and can determine motion information for the block, where the motion information is determined based on the frame rate up-conversion bilateral matching coding mode used for the block.

In another example, a computer readable medium is provided having stored thereon instructions that when executed by a processor perform a method that includes: obtaining the video data. The method further includes using frame rate up-conversion bilateral matching coding mode for a block of the video data, where local illumination compensation is disallowed from being used for the block when the frame rate up-conversion bilateral matching coding mode is used for the block. The method further includes determining motion information for the block, where the motion information is determined based on the frame rate up-conversion bilateral matching coding mode used for the block.

In another example, an apparatus is provided that includes means for obtaining the video data. The apparatus further comprises means for using frame rate up-conversion bilateral matching coding mode for a block of the video data, wherein local illumination compensation is disallowed from being used for the block when the frame rate up-conversion bilateral matching coding mode is used for the block. The apparatus further comprises means for determining motion information for the block, wherein the motion information is determined based on the frame rate up-conversion bilateral matching coding mode used for the block.

In some aspects, a local illumination compensation flag is not signaled for the block based on the frame rate up-conversion bilateral matching coding mode being used for the block.

In some aspects, the motion information includes at least one motion vector.

In some aspects, using frame rate up-conversion bilateral matching coding mode includes determining a first block in a first reference frame and determining a second block in a second reference frame, wherein the second block is associated with the first block. Using frame rate up-conversion bilateral matching coding mode can further include determining a motion trajectory from the first block to the second block and generating the block along a path of the motion trajectory.

In some aspects, the methods, apparatuses, and computer-readable medium described above can be performed by and/or included in a decoding device.

In some aspects, frame rate up-conversation bilateral matching is signaled for the block based on the frame rate up-conversion bilateral matching coding mode being used for the block. In these aspects, the methods, apparatuses, and computer-readable medium described above can further include deriving a value of the local illumination compensation flag to be false in response to the frame rate up-conversion bilateral matching coding mode being signaled for the block. In these aspects, the local illumination compensation is not used when the local illumination compensation flag is derived to be false.

In some aspects, the methods, apparatuses, and computer-readable medium described above can be used by and/or included in an encoding device.

In some aspects, the methods, apparatuses, and computer-readable medium described above further include performing a first-order Taylor expansion optimization to refine the motion information. In some aspects, performing the first-order Taylor expansion optimization includes deriving a motion vector by minimizing a sum of squared error (or a sum of absolute difference) between first-order Taylor expansions of the block at temporal positions of a first references picture and a second reference picture.

In some aspects, an apparatus as described above can include a display for displaying the video data.

In some aspects, an apparatus as described above can include a mobile device with a camera for capturing pictures.

According to at least one example, a method of processing video is provided that includes obtaining the video data. The method further includes using local illumination compensation for a block of the video data, where frame rate up-conversion bilateral matching coding mode is disallowed from being used for the block when local illumination compensation is used for the block. The method further includes determining motion information for the block, wherein the motion information is determined after local illumination compensation is used for the block.

In another example, an apparatus is provided that includes a memory configured to store video data and a processor. The processor is configured to and can obtain the video data. The processor is configured to and can use local illumination compensation for a block of the video data, wherein frame rate up-conversion bilateral matching coding mode is disallowed from being used for the block when local illumination compensation is used for the block. The processor is configured to and can determine motion information for the block, wherein the motion information is determined after local illumination compensation is used for the block.

In another example, a computer readable medium is provided having stored thereon instructions that when executed by a processor perform a method that includes: obtaining the video data. The method further includes using local illumination compensation for a block of the video data, where frame rate up-conversion bilateral matching coding mode is disallowed from being used for the block when local illumination compensation is used for the block. The method further includes determining motion information for the block, wherein the motion information is determined after local illumination compensation is used for the block.

In another example, an apparatus is provided that includes means for obtaining the video data. The apparatus further comprises means for using local illumination compensation for a block of the video data, wherein frame rate up-conversion bilateral matching coding mode is disallowed from being used for the block when local illumination compensation is used for the block. The apparatus further comprises means for determining motion information for the block, wherein the motion information is determined after local illumination compensation is used for the block.

In some aspects, a frame rate up-conversion bilateral matching coding mode flag is not signaled for the block based on local illumination compensation being used for the block.

In some aspects, using local illumination compensation includes using a least square method to derive a scaling factor and an offset.

In some aspects, the methods, apparatuses, and computer readable medium described above can be used by and/or be included in a decoding device.

In some aspects, local illumination compensation is signaled for the block based on the local illumination compensation being used for the block. In these aspects, the methods, apparatuses, and computer readable medium described above can further include deriving a value for the frame rate up-conversion bilateral matching coding mode flag to be false in response to the local illumination compensation being signaled for the block, where frame rate up-conversion bilateral matching coding mode is not used when the frame rate up-conversion bilateral matching coding mode flag is derived to be false.

In some aspects, the methods, apparatuses, and computer readable medium described above can be used by and/or be included in an encoding device.

In some aspects, the methods, apparatuses, and computer readable medium described above can further include using a first order Taylor expansion optimization to refine the motion information. In some aspects, using the first-order Taylor expansion optimization includes deriving a motion vector by minimizing a sum of squared error (or a sum of absolute difference) between first-order Taylor expansions of the block at temporal positions of a first references picture and a second reference picture.

In some aspects, an apparatus as described above can include a display for displaying the video data.

In some aspects, an apparatus as described above can include a mobile device with a camera for capturing pictures.

According to at least one example, a method of obtaining the video data is provided that includes obtaining video the video data. The method further includes using frame rate up-conversion bilateral matching coding mode for a block of the video data, where using the frame rate up-conversion bilateral matching coding mode includes applying an affine motion model to the block. The method further includes determining, based on application of the affine motion model to the block, first affine motion information for a first reference picture and second affine motion information for a second reference picture. The method further includes determining at least one prediction for the block using the first affine motion information and the second affine motion information.

In another example, an apparatus is provided that includes a memory configured to store video data and a processor. The processor is configured to and can obtain the video data. The processor is configured to and can use frame rate up-conversion bilateral matching coding mode for a block of the video data, wherein using the frame rate up-conversion bilateral matching coding mode includes applying an affine motion model to the block. The processor is configured to and can determine, based on application of the affine motion model to the block, first affine motion information for a first reference picture and second affine motion information for a second reference picture. The processor is configured to and can determine at least one prediction for the block using the first affine motion information and the second affine motion information.

In another example, a computer readable medium is provided having stored thereon instructions that when executed by a processor perform a method that includes: obtaining video the video data. The method further includes using frame rate up-conversion bilateral matching coding mode for a block of the video data, where using the frame rate up-conversion bilateral matching coding mode includes applying an affine motion model to the block. The method further includes determining, based on application of the affine motion model to the block, first affine motion information for a first reference picture and second affine motion information for a second reference picture. The method further includes determining at least one prediction for the block using the first affine motion information and the second affine motion information.

In another example, an apparatus is provided that includes means for obtaining the video data. The apparatus further comprises means for using frame rate up-conversion bilateral matching coding mode for a block of the video data, wherein using the frame rate up-conversion bilateral matching coding mode includes applying an affine motion model to the block. The apparatus further comprises means for determining, based on application of the affine motion model to the block, first affine motion information for a first reference picture and second affine motion information for a second reference picture. The apparatus further comprises means for determining at least one prediction for the block using the first affine motion information and the second affine motion information.

In some aspects, the methods, apparatuses, and computer readable medium described above further include determining a first prediction for the block, where the first prediction is determined using the first reference picture and the first affine motion information. These aspects can further include determining a second prediction for the block, where the second prediction is determined using the second reference picture and the second affine motion information.

In some aspects, the affine motion model is applied instead of a translational motion model.

In some aspects, the affine motion model is applied in addition to a translational motion model.

In some aspects, the methods, apparatuses, and computer readable medium described above further include applying a translational motion model to the block, where translational motion information of the block is derived using the translational motion model. These aspects can further include applying the affine motion model to the block, where the translational motion information is used as input by the affine motion model to derive the first affine motion information and the second affine motion information.

In some aspects, the methods, apparatuses, and computer readable medium described above further include determining a matching cost of the affine motion model is less than a matching cost of the translational motion model. These aspects can further include signaling application of the affine motion model in a bitstream.

In some aspects, the methods, apparatuses, and computer readable medium described above further include determining a matching cost of the affine motion model is greater than a matching cost of the translational motion model. These aspects can further include signaling application of the translational motion model in a bitstream.

In some aspects, the methods, apparatuses, and computer readable medium described above further include determining that a size of the block is greater than a threshold size, where the affine motion model is applied to the block in response to determining the size of the block is greater than the threshold size.

In some aspects, the methods, apparatuses, and computer readable medium described above further include performing a first-order Taylor expansion optimization to refine the at least prediction for the block. In some aspects, performing the first-order Taylor expansion optimization includes deriving a motion vector by minimizing a sum of squared error (or a sum of absolute difference) between first-order Taylor expansions of the block at temporal positions of the first reference picture and the second reference picture.

In some aspects, the methods, apparatuses, and computer readable medium described above can be performed by and/or be included in a decoding device.

In some aspects, the methods, apparatuses, and computer readable medium described above can be performed by and/or be included in an encoding device.

In some aspects, an apparatus as described above can include a display for displaying the video data.

In some aspects, an apparatus as described above can include a mobile device with a camera for capturing pictures.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following drawing figures.

DETAILED DESCRIPTION

Figure 1:
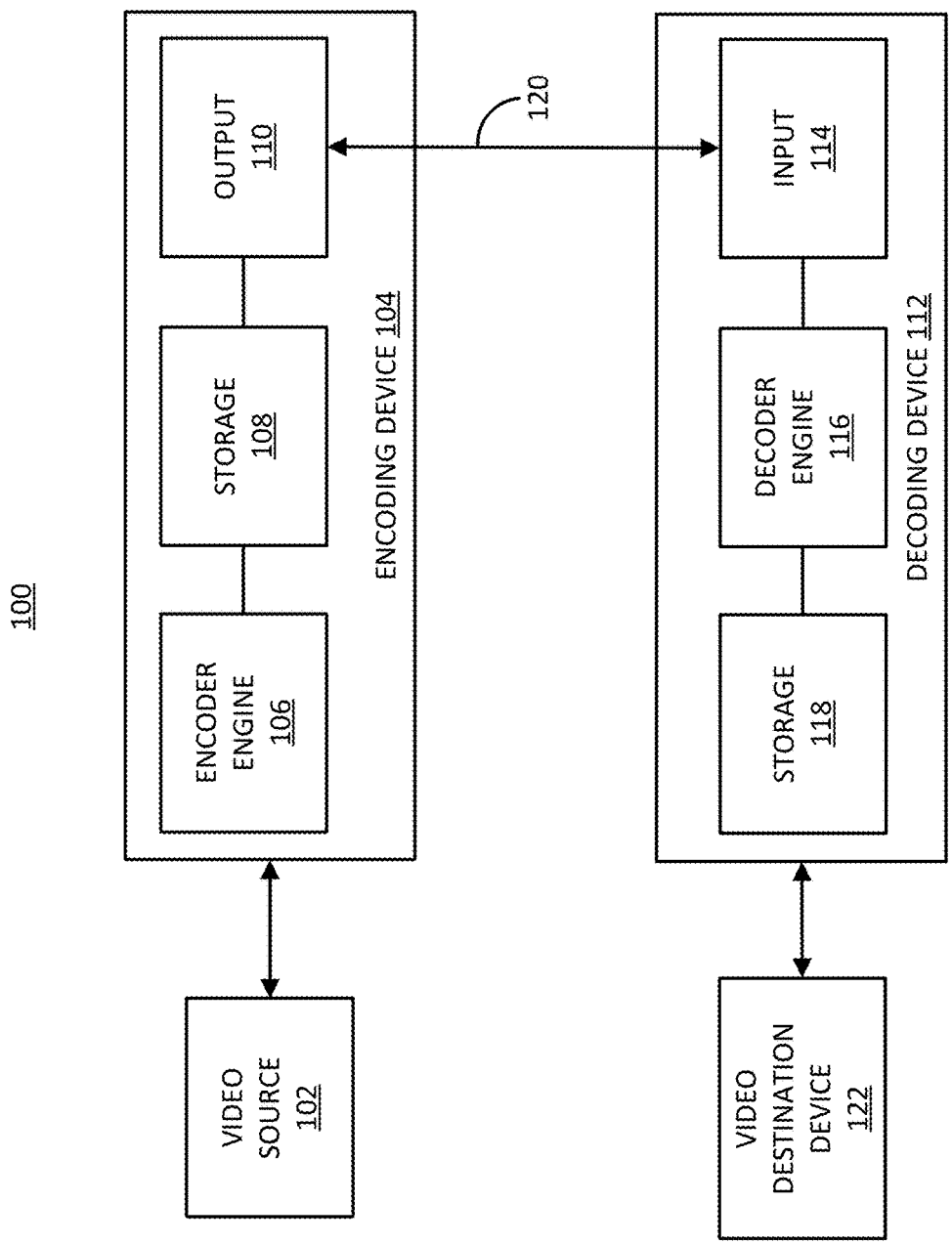
FIG. 1 is a block diagram illustrating an example of an encoding device and a decoding device.

Certain aspects and implementations are provided below. Some of these aspects and implementations may be applied independently and some of them may be applied in combination as would be apparent to those of skill in the art. In the following description, for the purposes of explanation, specific details are set forth in order to provide a thorough understanding of various implementations. However, it will be apparent that various implementations may be practiced without these specific details. The figures and description are not intended to be restrictive.

The ensuing description provides example implementations only, and is not intended to limit the scope, applicability, or configuration of the disclosure. Rather, the ensuing description of the example implementations will provide those skilled in the art with an enabling description for implementing an example. It should be understood that various changes may be made in the function and arrangement of elements without departing from the spirit and scope of the invention as set forth in the appended claims.

Specific details are given in the following description to provide a thorough understanding of different implementations. However, it will be understood by one of ordinary skill in the art that the implementations may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, various examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality. As used herein, "coding" refers to "encoding" or "decoding."

FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (WET) to explore new coding tools for the next generation of video coding standard. The reference software is called JEM (joint exploration model).

Many examples described herein provide examples using the JEM model, the HEVC standard, and/or extensions thereof. However, the techniques and systems described herein may also be applicable to other coding standards, such as AVC, MPEG, extensions thereof, or other suitable coding standards that currently exist or future coding standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision, or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or the like) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units including VCL NAL units and non-VCL NAL units. VCL NAL units include coded picture data forming a coded video bitstream. For example, a sequence of bits forming the coded video bitstream is resent in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116 or to storage 118 for later use by the decoder engine 116. The decoder engine 116 may decode the encoded video bitstream data by entropy decoding (e.g., using an entropy decoder) and extracting the elements of the one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 112, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 19. An example of specific details of the decoding device 112 is described below with reference to FIG. 20.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As described above, for each block, a set of motion information (also referred to herein as motion parameters) can be available. A set of motion information can contain motion information for forward and backward prediction directions. Here, forward and backward prediction directions are two prediction directions of a bi-directional prediction mode and the terms "forward" and "backward" do not necessarily have a geometry meaning. Instead, forward and backward can correspond to reference picture list 0 (RefPicList0) and reference picture list 1 (RefPicList1) of a current picture. In some examples, when only one reference picture list is available for a picture or slice, only RefPicList0 is available and the motion information of each block of a slice is always forward. In some examples, RefPicList0 includes reference pictures that precede a current picture in time, and RefPicList1 includes reference pictures that follow the current picture in time.

In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed a way that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of reference picture set as in HEVC, and/or motion vector scaling, among other things.

In H.264/AVC, each inter-macroblock (MB) may be partitioned into four different ways, including: one 16×16 macroblock partition; two 16×8 macroblock partitions; two 8×16 macroblock partitions; and four 8×8 macroblock partitions, among others.

Different macroblock partitions in one macroblock may have different reference index values for each prediction direction (e.g., different reference index values for RefPicList0 and RefPicList1).

In some cases, when a macroblock is not partitioned into four 8×8 macroblock partitions, the macroblock can have only one motion vector for each macroblock partition in each prediction direction.

In some cases, when a macroblock is partitioned into four 8×8 macroblock partitions, each 8×8 macroblock partition can be further partitioned into sub-blocks, each of which can have a different motion vector in each prediction direction. A 8×8 macroblock partition can be divided into sub-blocks in different ways, including: one 8×8 sub-block; two 8×4 sub-blocks; two 4×8 sub-blocks; and four 4×4 sub-blocks, among others.

Each sub-block can have a different motion vector in each prediction direction. Therefore, a motion vector can be present in a level equal to or higher than a sub-block.

In AVC, temporal direct mode can be enabled in either the macroblock or the macroblock partition level for skip or direct mode in B-slices. For each macroblock partition, the motion vectors of the block co-located with the current macroblock partition in the RefPicList1[0] of the current block can be used to derive the motion vectors. Each motion vector in the co-located block can be scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree the nodes of which are coding units. The size of a CTB can range from 16×16 pixels to 64×64 pixels in the HEVC main profile. In some cases, 8×8 pixel CTB sizes can be supported. A coding unit (CU) could be the same size of a CTB and as small as 8×8 pixels. In some cases, each coding unit is coded with one prediction mode. When a CU is inter-coded, the CU may be further partitioned into two or four prediction units (PUs), or may be treated as one PU when further partitioning does not apply. When two PUs are present in one CU, the two PUs can be half size rectangles or two rectangles that are ¼ or ¾ the size of the CU.

When the CU is inter-coded, one set of motion information can be present for each PU. In addition, each PU can be coded with a unique inter-prediction mode to derive the set of motion information.

For motion prediction in HEVC, there can be two inter-prediction modes for a prediction unit, including merge mode (note that skip is considered as a special case of merge) and advanced motion vector prediction (AMVP).

In either AMVP or merge mode, a motion vector (MV) candidate list can be maintained for multiple motion vector predictors. The motion vector(s), as well as reference indices in the merge mode, of the current PU can generated by taking one candidate from the MV candidate list.

In some examples, the MV candidate list can contain up to five candidates for the merge mode and two candidates for the AMVP mode. In other examples, different numbers of candidates can be included in a MV candidate list for merge mode or AMVP mode. A merge candidate may contain a set of motion information (e.g., motion vectors corresponding to both reference picture lists (list 0 and list 1)) and the reference indices. If a merge candidate is identified by a merge index, the reference pictures can be used for the prediction of the current block. The reference picture can also be used to determine associated motion vectors. An AVMP candidate contains only a motion vector; thus, in AVMP mode, a reference index may need to be explicitly signaled, together with an MVP index to the MV candidate list, for each potential prediction direction from either list 0 or list 1. In AMVP mode, the predicted motion vectors can be further refined.

As can be seen above, a merge candidate corresponds to a full set of motion information, while an AMVP candidate contains just one motion vector for a specific prediction direction and reference index.

The candidates for both modes can be derived similarly from the same spatial and/or temporal neighboring blocks.

Figure 2B:
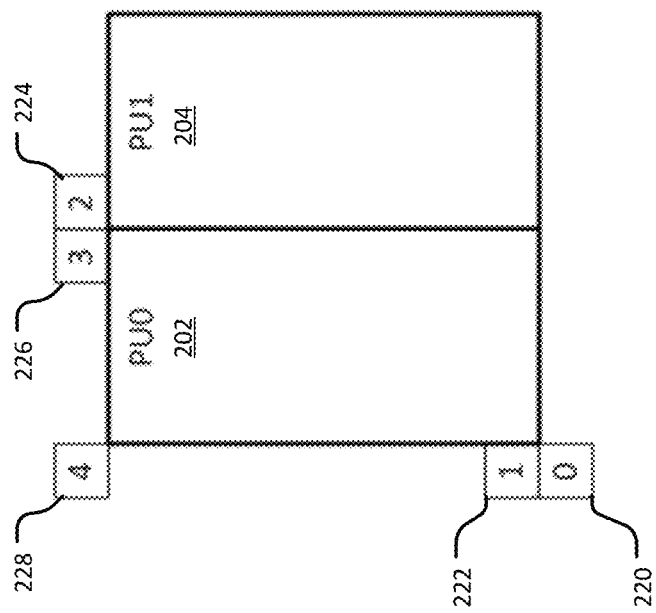
FIG. 2B illustrates an example of a method for deriving spatial neighboring MV candidates for AVMP mode.
Figure 2A:
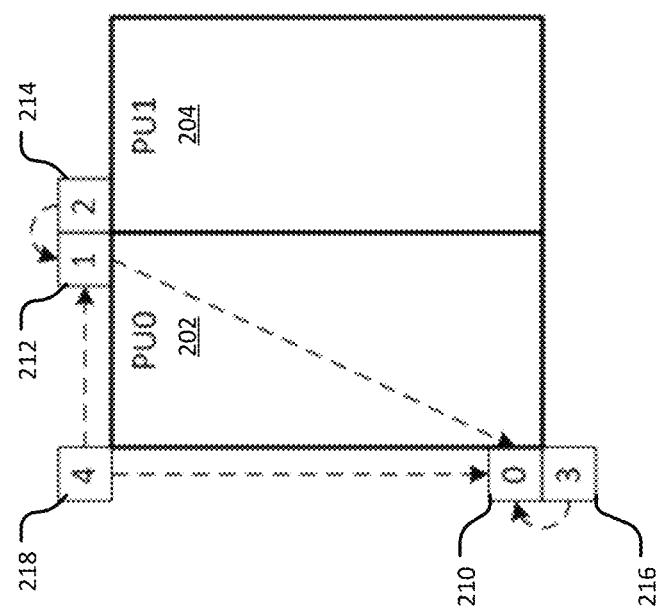
FIG. 2A illustrates an example of a method for deriving spatial MV candidates for merge mode.

FIG. 2A and FIG. 2B illustrate example derivations of spatial neighboring MV candidates. Spatial MV candidates for a specific PU (PU0 202) can be derived from neighboring blocks, including relative to a neighboring PU (PU1 204), located to the right of PU0 202.

FIG. 2A illustrates an example of a method for deriving spatial MV candidates for merge mode. In merge mode, up to five spatial MV candidates can be derived in, for example, the following order: a left candidate 210 (block 0), an above candidate 212 (block 1), an above right candidate 214 (block 2), a below left candidate 216 (block 3), and an above left candidate 218 (block 4). The locations of the spatial MV candidates with respect to PU0 202 is illustrated in FIG. 2A. Specifically, the left candidate 210 is located adjacent to and to the left of the lower left corner of PU0 202; the above candidate 212 is located adjacent to and above the upper right corner of PU0 202; the above right candidate 214 is located adjacent to and above the upper left corner of neighboring PU1 204; the below left candidate 216 is located below the left candidate 210; and the above left candidate 218 is located above and to the left of the upper left corner of PU0 202.

FIG. 2B illustrates an example of a method for deriving spatial neighboring MV candidates for AVMP mode. In AVMP mode, the neighboring blocks are divided into, for example two groups. The first group, which can be referred to as a left group, can include a first block 220 (block 0), located below and to the left of PU0 202, and a second block 222 (block 1), located to the left of and adjacent to the lower left corner of PU0 202. The second group, which can be referred to as the above group, can include a third block 224 (block 2), located above and adjacent to the upper left corner of neighboring PU1 204, a fourth block 226 (block 3) located above and adjacent to the upper right corner of PU0 202, and a fifth block 228 (block 4), located above and to the left of the upper left corner of PU0 202. For each group, a candidate neighbor block can have the highest priority among blocks to be chosen to form a final candidate of the group, when the candidate neighbor block refers to the same reference picture as indicated by the signaled reference index. In some cases, it is possible that all neighboring blocks do not contain a motion vector pointing to the same reference picture. Therefore, if such a candidate cannot be found, the first available candidate can be scaled to form the final candidate, so that the temporal distance differences can be compensated.

Temporal motion vector prediction is another method for determining motion vectors in HEVC. A temporal motion vector predictor (TMVP) candidate, when enabled and available, can be added to the MV candidate list, for example after spatial motion vector candidates. The process of motion vector derivation for TMVP candidate can be the same for both merge and AMVP modes. In some cases, however, the target reference index for the TMVP candidate in the merge mode can always be set to 0.

Figures 3A, 3B:
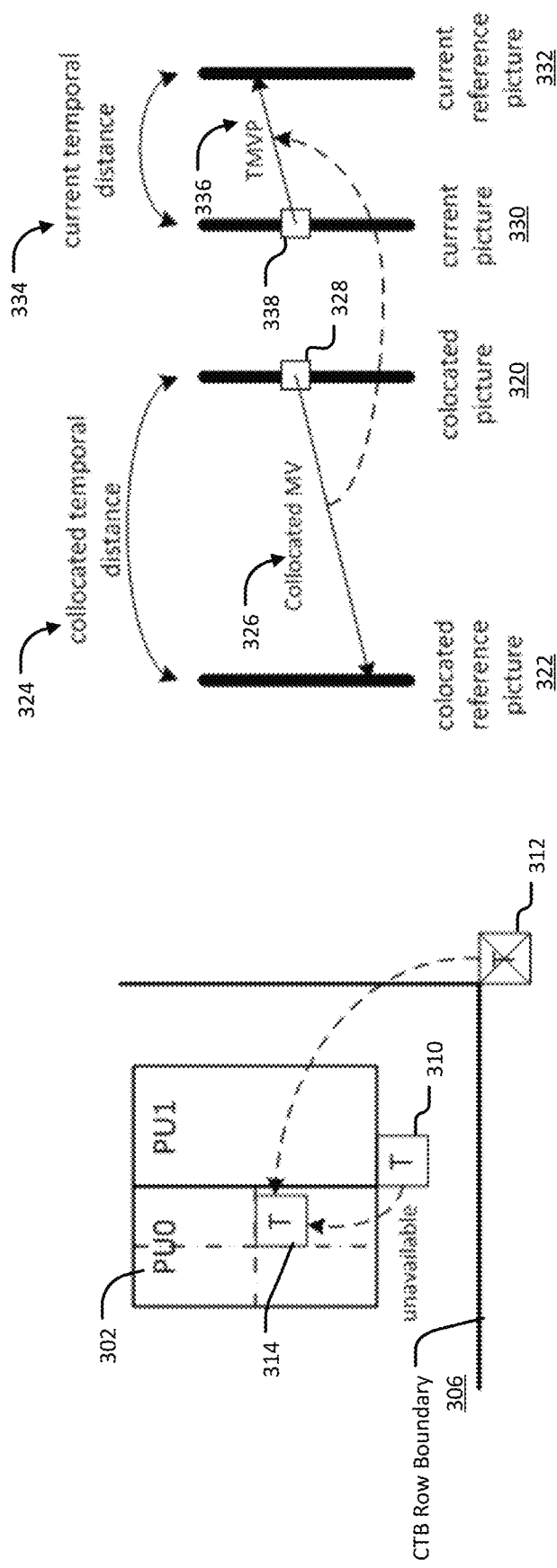
FIG. 3A illustrates an example derivation of a TMVP candidate
FIG. 3B illustrates an example of motion vector (MV) scaling.

FIG. 3A illustrates an example derivation of a TMVP candidate. The primary block location for TMVP candidate derivation is the bottom right block outside of the co-located PU 302, as shown in FIG. 3A as a block 310. The bottom right location of block 310 can compensate bias in the above and left direction for blocks used to generate spatial neighboring candidates. When the block in the bottom right location is located outside of the current CTB row 306 (as illustrated by block 312) or motion information is not available, the block is substituted with a center block 314 of the PU 302.

FIG. 3B illustrates an example of motion vector (MV) scaling. For a block 338 in a current picture 330, a motion vector for a TMVP candidate 336 can be derived from the co-located PU 328 of the co-located picture 320. The co-located picture 320 can be indicated, for example, in the slice level. Specifically, for the block 338 in the current picture 330, the co-located PU 328 in the co-located picture 320 can be determined. The co-located PU 328 can have a co-located motion vector 326, which references a co-located reference picture 322. The co-located motion vector 326 can be used as the TMVP candidate.

Similar to temporal direct mode in AVC, in some cases, the TMVP candidate 336 can be scaled. For example, the current temporal distance 334 between the current picture 330 and the current reference picture 332 can be different than the co-located temporal distance 324 between the co-located picture 320 and the co-located reference picture 322. In this example, the TMVP can be scaled to normalize the difference in the temporal distances.

Merge and AMVP modes can include other aspects, such as motion vector scaling, artificial motion vector candidate generation, and a pruning process for candidate insertion.

With respect to motion vector scaling, it can be assumed that the value of motion vectors is proportional to the distance of pictures in the presentation time. A motion vector associates two pictures: the reference picture and the picture containing the motion vector (which can be referred to as the containing picture). When a motion vector is used to predict another motion vector, the distance of the containing picture and the reference picture can be calculated based on the Picture Order Count (POC) values.

For a motion vector that is predicted, the containing picture and the reference picture associated with the predicted motion vector may be different from the containing picture and the reference picture associated with the motion vector from which the predicted motion vector is predicted. Thus, for the predicted motion vector, a new distance (based, for example, on the POC), can be determined. The predicted motion vector can them be scaled using the new distance and the distance associated with the motion vector being used for the prediction. For a spatial neighboring candidate, the containing pictures for the two motion vectors are the same, while the reference pictures may be different. In HEVC, motion vector scaling applies to both TMVP and AMVP for spatial and temporal neighboring candidates.

With respect to artificial motion vector candidate generation, when a motion vector candidate list is not complete, artificial motion vector candidates can be generated and inserted, for example, at the end of the list until the list has a complete set of candidates.

In merge mode, there can be two types of artificial MV candidates: a combined candidate derived only for B-slices; and a zero candidate used only for AMVP when the combined candidate type does not provide enough artificial candidates.

For each pair of candidates that are already in the candidate list and that have motion information, bi-directional combined motion vector candidates can derived. A bi-directional combined motion vector candidate can be derived from a combination of the motion vector of the first candidate, where the first candidate is a picture in the list 0, and the motion vector of a second candidate, where the second candidate is picture in the list 1.

With respect to a pruning process for candidate insertion, candidates from different blocks may be the same, which can decrease the efficiency of a merge and/or AMVP candidate list. A pruning process can be applied to remove duplicate candidates. The pruning process can, for example, compare one candidate against the others in the current candidate list to avoid inserting an identical candidate, for at least some cases. To reduce processing complexity, in some cases a limited pruning process may be applied, in which not all candidates are compared with all candidates in the list.

Frame rate up-conversion (FRUC) techniques can be used to generate high-frame rate videos from low-frame rate videos. FRUC has been widely used in display industry. FRUC techniques can be divided into two types. One technique interpolates intermediate frames by frame repetition or averaging. This technique, however, may provide poor results in a video that contains a lot of motion. A second technique, called motion-compensated FRUC (MC-FRUC), can consider object movement when generating intermediate frames. MC-FRUC can includes two steps: first, motion estimation (ME), and second, motion-compensated interpolation (MCI). Motion estimation can generate motion vectors (MVs), which represent object motion using vectors, and motion-compensated interpolation can use motion vectors generate intermediate frames.

The block-matching algorithm (BMA) is widely used for motion estimation in MC-FRUC, as it is simple to implement. The block-matching algorithm divides an image into blocks and detects the movement of those blocks. Various kinds of motion estimation can be used for the block-matching algorithm, including: unilateral motion estimation and bilateral motion estimation.

Figure 4:
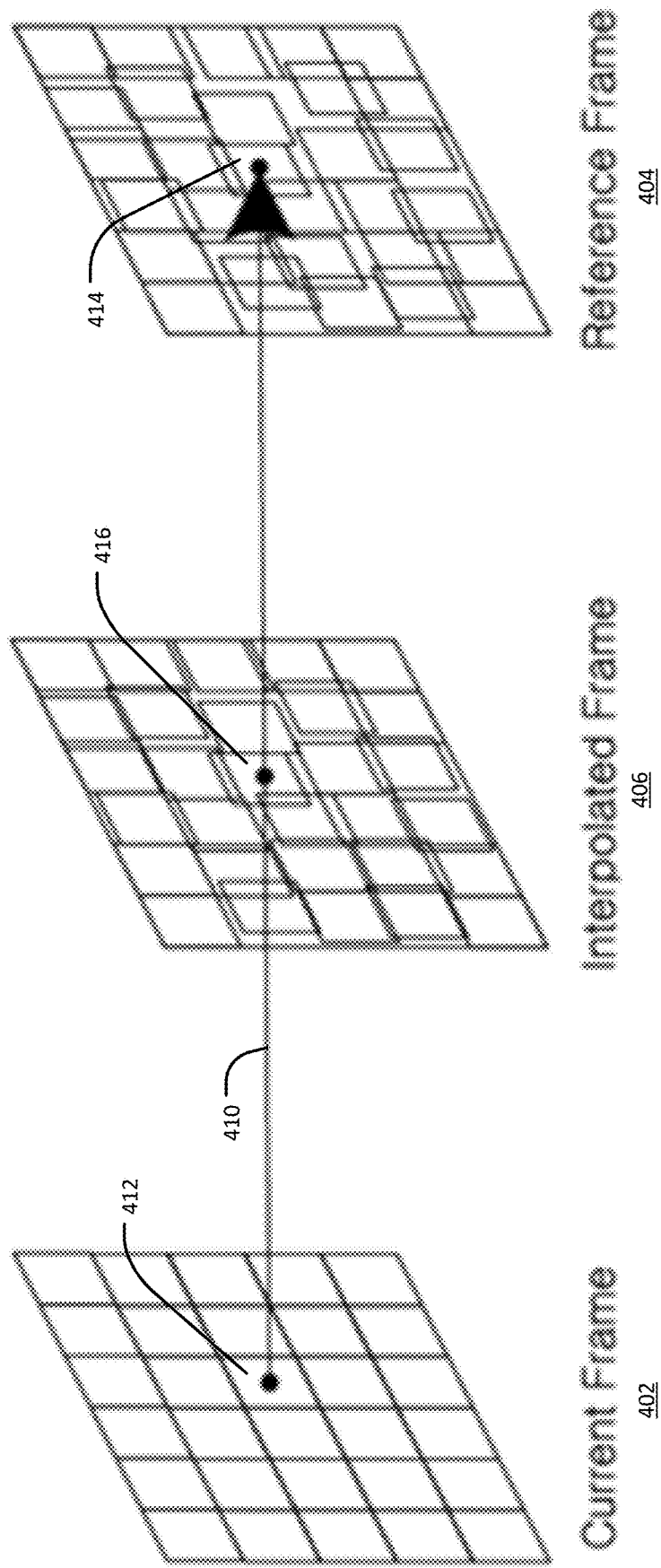
FIG. 4 illustrates an example of unilateral motion estimation in frame rate up-conversion.

FIG. 4 illustrates an example of unilateral motion estimation in frame rate up-conversion. As illustrated by the example of FIG. 4, unilateral motion estimation can obtain a motion vector 410 by, for a given block 412 in the current frame 402, searching for the best matching block 414 in a reference frame 404 of the current frame 402. An interpolated frame 406, temporally located between the current frame 402 and the reference frame 404, can be generated using the motion vector 410. Specifically, an interpolated block 416 can be located along the path of the motion vector 410, so that consistent motion can occur between the current frame 402 and the reference frame 404. In this example, three blocks from three frames follow the motion trajectory.

Although the block 412 in the current frame 402 may belong to a coded block, the best matching block 414 in the reference frame 404 may not fully belong to a coded block. In some cases, the interpolated block 416 in the interpolated frame 406 might not belong to a coded block either. Consequently, overlapped regions of the blocks and un-filled (holes) regions may occur in the interpolated frame 406. A simple method to handle overlapping regions involves averaging and overwriting the overlapped pixels. Holes can be covered by the pixel values from the reference frame 404 or the current frame 402. These methods, however, can result in blocking artifacts and/or blurring. As an alternative, motion field segmentation, successive extrapolation using the discrete Hartley transform, and image in-painting can be used for overlaps and holes in an interpolated frame, without increasing blocking artifacts and blurring.

Figure 5:
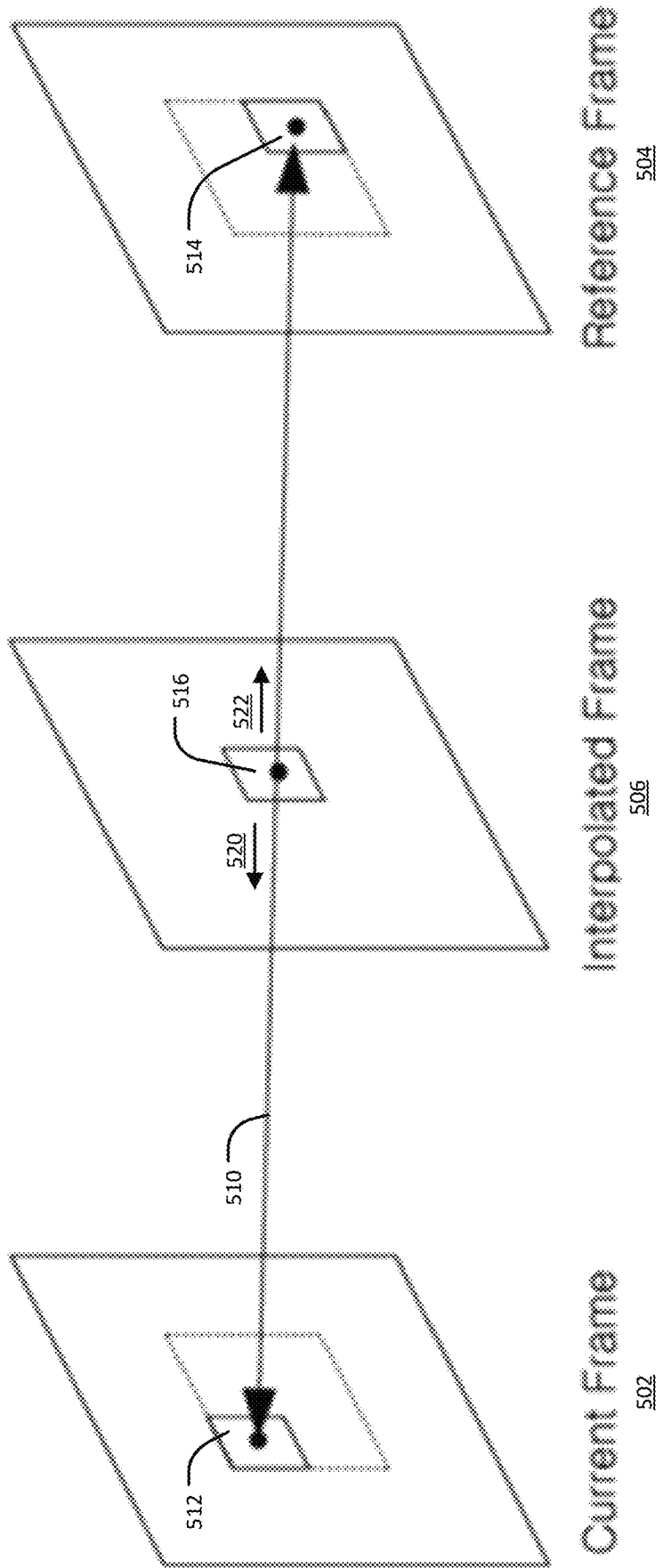
FIG. 5 illustrates an example of bilateral motion estimation for frame rate up-conversion.

FIG. 5 illustrates an example of bilateral motion estimation for frame rate up-conversion. Bilateral motion estimation is another technique that can be used with motion-compensated FRUC to avoid overlaps and holes in an interpolated frame 506. As with unilateral motion estimation, for a given block 512 in the current frame 502, bilateral motion estimation obtains a motion vector 510 using a best matching block 514 in the reference frame 504 of the current frame 502. Bilateral motion estimation then assumes temporal symmetry between the interpolated frame 506 and both the current frame 502 and the reference frame 504, such that the motion vector 510 can be divided into a first motion vector 520 between an interpolated block 516 and the current frame 502 and a second motion vector 522 between the interpolated block and the reference frame 504.

When bilateral motion estimation is used for each block in the interpolated frame 506, overlaps and holes should not result in the interpolated frame 506. In video coding, the current block 512 is, in most cases, being coded in a certain order (e.g., in decoding order) with respect to other blocks in the current frame 502. Because the blocks in the current frame 502 are processed in a sequence, the sequence should result in the interpolated frame 506 being generated without any occurrences of overlaps or holes.

Signaling motion information (e.g., inserting data into a video bitstream that can describe the motion information) can be costly in terms of increasing the amount of bits that may need to be included in a bitstream. To reduce the bit cost of motion information, Decoder-side Motion Vector Derivation (DMVD) can be used by decoding devices.

Figure 6:
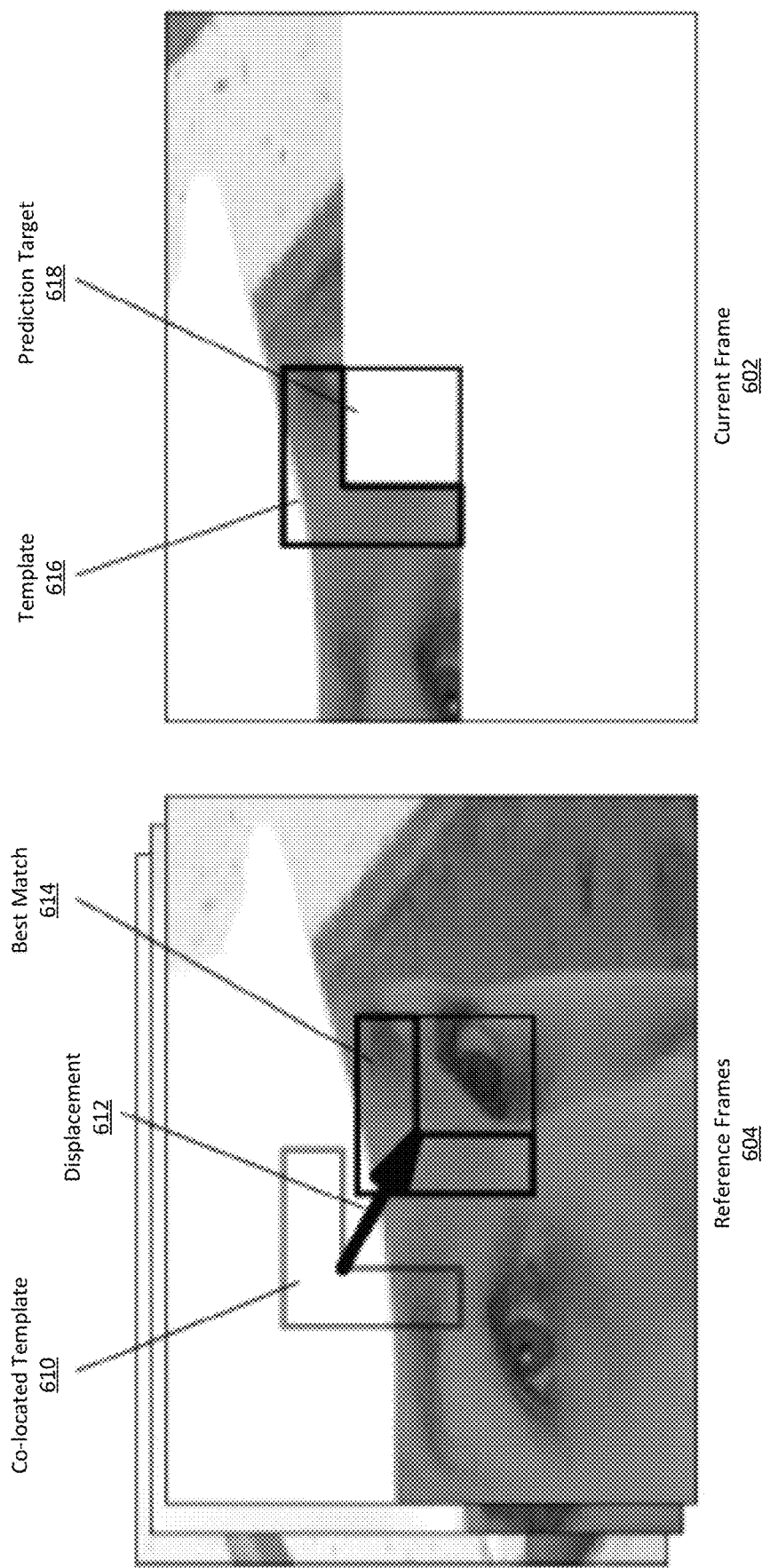
FIG. 6 illustrates an example of template matching-based decoder-side motion vector derivation.

Template matching-based decoder-side motion vector derivation is one method for reducing the bit cost of motion information and increasing coding efficiency. FIG. 6 illustrates an example of template matching-based decoder-side motion vector derivation. For a current block in a current frame 602 (e.g., a prediction target 618), instead of searching best match for the current block, a best match 614 of a template 616 is searched for in the reference frame 604. Assuming the template 616 and the prediction target 618 are from the same object, the displacement 612 of the template 616 (derived from a co-located template 610 in the reference frame 604, where the co-located template 610 corresponds to the location of template 616 in the reference frame 604) can be used as the motion vector of the prediction target 618. Since the template matching is conducted at both encoder and decoder, the motion vector can be derived at decoder side to avoid signaling cost.

Another method for decoder-side motion vector derivation is mirror-based bi-directional motion vector derivation.

Figure 7:
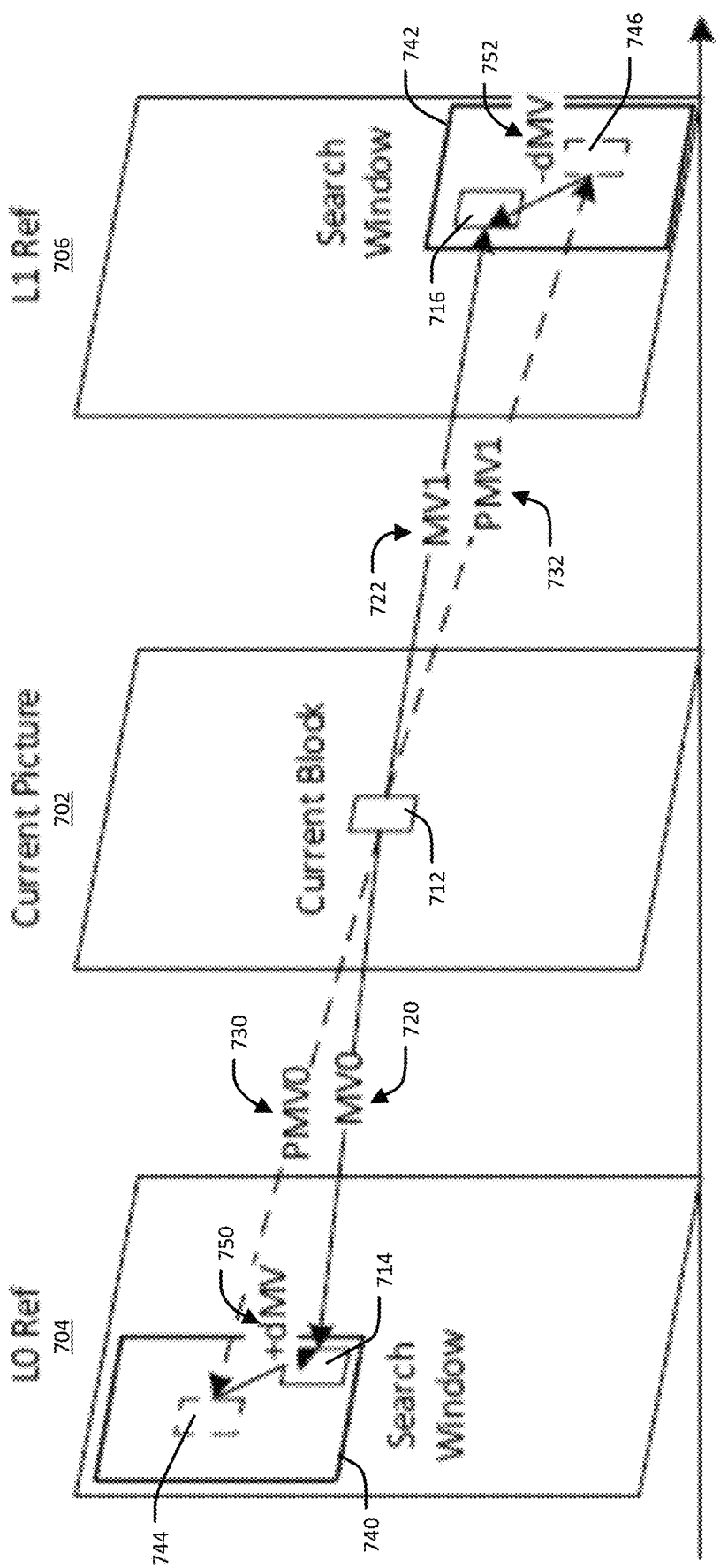
FIG. 7 illustrates an example of mirror-based bi-directional motion vector derivation.

FIG. 7 illustrates an example of mirror-based bi-directional motion vector derivation. Mirror-based bi-directional motion vector derivation includes using centro-symmetric motion estimation around search centers, with fractional sample accuracy. The size and/or location of the search window can be pre-defined for a decoder, and/or can be signaled in the bitstream.

As illustrated in the example of FIG. 7, centro-symmetric motion estimation includes searching both an L0 reference picture 704 (e.g., a reference frame selected from RefPicList0) and an L1 reference picture 706 (e.g., a reference frame selected from RefPicList1) for a reverse best matching block 714 and a forward best matching block 716. The reverse best matching block 714 and the forward best matching block can then be used to determine a reverse motion vector, MV0 720, and a forward motion vector, MV1 722, respectively. MV0 720 and MV1 722 can then be used to predict a location for a current block 712 in a current picture 702. In some cases, the current picture 702 is being generated in the process of applying a frame rate up-conversion coding mode.

To determine the reverse best matching block 714 and the forward best matching block 716, the process can use a reverse predicted motion vector, PMV0 730, and a forward predicted motion vector, PMV1 732, as a starting point. PMV0 730 and PMV1 can be provided with the L0 reference picture 704 and the L1 reference picture 706, respectively, or can be derived using the L0 reference picture 704 and the L1 reference picture 706. In the L0 reference picture 704, a search window 740 can be searched for the best matching reverse block 714 by testing various values of an offset, +dMV 750 from the predicted block 744 indicated by PMV0 730. At the same time, a search window 742 in the L1 reference picture 706 can be searched, using an offset, −dMV 752, from the predicted block 746 indicated by PMV1 732. In some examples, all values of +dMV 750 and −dMV 752 can be checked. The offset values can then be added to PMV0 730 and PMV1 732 to determine MV0 720 and MV1 722. In some cases, +dMV 750 and/or −dMV 752 can include one or more negative components.

In some examples, the Sum of Absolute Difference (SAD) between the best matching blocks in the L0 reference picture 704 and the L1 reference picture 706 can be used to determine centro-symmetric motion estimation. A motion vector pair (e.g., MV0 720 and MV1 722) with the minimum SAD value can be selected as the output of centro-symmetric motion estimation.

The example illustrated in FIG. 7 uses a future reference (e.g., reference at a temporal position later than the current frame) and an earlier reference (e.g., a reference at a temporal position earlier than the current frame) for the SAD matching. This method thus may not be applicable for frames, such as P-frames and low-delay B frames, in which only a future reference is available.

Figure 8:
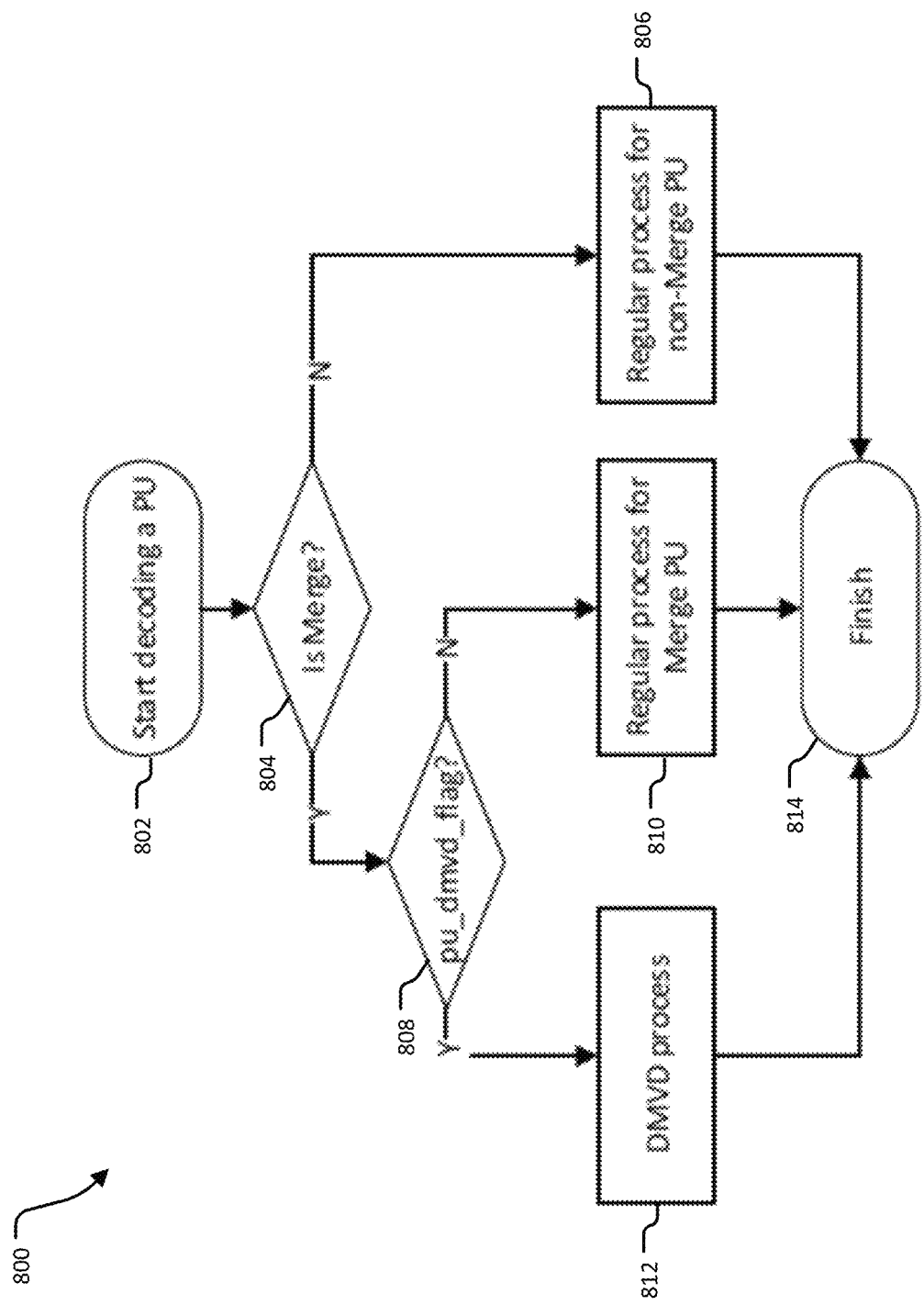
FIG. 8 illustrates an example of a process for decoding PU that includes the pu_dmvd_flag.

In some cases, mirror based bi-directional motion vector derivation can be combined with merge mode in HEVC. For example, a flag called pu_dmvd_flag can be added for a PU of B-slices to indicate whether decoder-side motion vector derivation mode can be applied to the current PU. FIG. 8 illustrates an example of a process 800 for decoding PU that includes the pu_dmvd_flag. In decoder-side motion vector derivation mode a bitstream being decoded does not include explicit motion vector information. Inclusion of the pu_dmv_flag can signal to the decoder that the decoder should engage a decoder-side motion vector derivation process.

At step 802, the process 800 starts decoding a PU. At step 804, the process 800 determines whether the PU is a merge PU. When the PU is not a merge PU, the process 800 proceeds to step 806, and decodes the PU using a regular process for non-merge PUs.

When, at step 804, the process 800 determines that the PU is a merge PU, then the process proceeds to step 808. At step 808, the process 800 determines a value of the pu_dmvd_flag. The pu_dmvd_flag can indicate whether a decoder should use a decoder-side motion derivation process. When the pu_dmvd_flag indicates that the decoder should not use a decoder-side motion derivation process, then the process 800 proceeds to step 810, and engages in a regular process for decoding a merge PU.

When, at step 808, the pu_dmvd_flag indicates that the decoder should use a decoder-side motion derivation process, then the process proceeds to step 812. At step 812, the process 800 uses a decoder-side motion vector derivation process to decode the PU.

Each of steps 806, 810, and 812 proceed to step 814, where decoding of the PU is finished.

To find a motion vector of a block, fast motion search methods can be used to minimize the computation cost of motion vector derivation. Examples of fast motion search methods include Block-Based Gradient Descent Search (BBGDS), Unrestricted Center-Biased Diamond Search (UCBDS), HEXagon-Based Search (HEBS), and others. These and other methods search a certain number of positions inside a search window, using a pre-defined search pattern. When motion in a video is small and moderate, these methods can work well.

In U.S. Publication No. 2016/0286230, which is hereby incorporated by reference in its entirety for all purposes, a coding mode based on frame rate up-conversion, referred to herein as FRUC mod, was described. As discussed in the reference, FRUC mode is a special merge mode, in which motion information of a block is not signaled (e.g., not included in a bitstream) but is instead derived at by a decoder.

In some examples, a FRUC flag is signaled (e.g., the flag is included in the bitstream) for a CU when the merge flag is true for the CU. When the FRUC flag is false, a merge index may be signaled and the regular merge mode can be used. When the FRUC flag is true, an additional FRUC mode flag is signaled to indicate which method (e.g., bilateral matching or template matching) is to be used to derive motion information for a block in the CU.

During the motion derivation process, an initial motion vector can first derived for the whole CU using bilateral matching or template matching. First, the merge list of the CU is checked and the candidate that leads to the minimum matching cost can selected as the starting point. Then, a local search based on bilateral matching or template matching around the starting point can be performed and the motion vector that results in the minimum matching cost can be taken as the motion vector for the whole CU. Subsequently, the motion information can be further refined at sub-block level with the derived CU motion vectors as the starting points.

Figure 9:
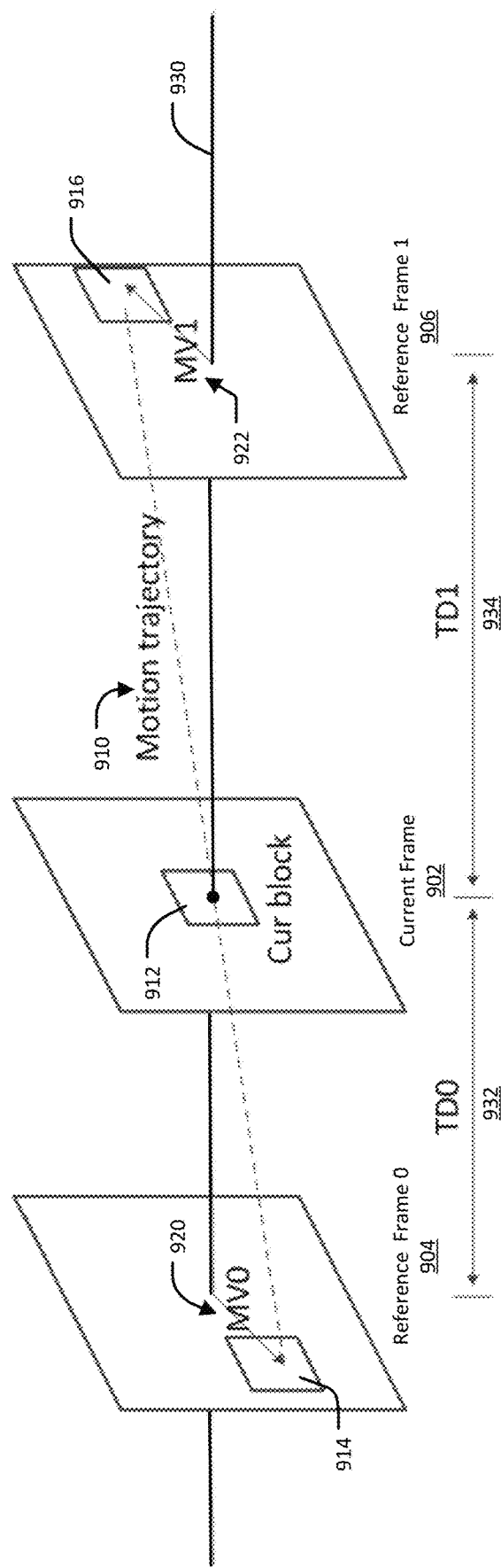
FIG. 9 illustrates an example of bilateral matching.

FIG. 9 illustrates an example of bilateral matching. In bilateral matching, the motion information for a current block 912 in a current frame 902 can be derived, where the current frame 902 is being generated through use of a frame rate up-conversion coding mode. Specifically, a continuous motion trajectory 910 can be assumed between a first block 914 in a first reference frame, Reference Frame 0 904, and a second block 916 in a second reference frame, Reference Frame 1 906. A motion vector relative to Reference Frame 0 904, MV0 920, can be determined for the current block 912. For example, the current block's position in Reference Frame 0 904 as determined by an orthogonal axis 930 centered on the current block 912 can be used to determine MV0 920. Similarly, a motion vector relative to Reference Frame 1 906, MV1 922, can be determined using the current block's position in Reference Frame 1 906 as given by the orthogonal axis 930. Because the motion trajectory 910 is assumed to be continuous, MV0 920 and MV1 922 can be proportional to the temporal distances (TD0 932 and TD1 934, respectively) between the current frame 902 and the two reference frames. That is, MV0 920 can be scaled based on TD0 932, and MV1 can be scaled based on TD1 934.

In some cases, TD0 932 and TD1 can be the same. In these cases, the results from bilateral matching can be the same as the results from mirror-based bi-direction motion vector derivation.

In the example of FIG. 9, the continuous motion trajectory 910 can be assumed to be non-linear, in which case an affine motion model can be applied. Using an affine motion model, affine motion information can be derived for Reference Frame 0 904 and Reference Frame 1 906.

An example application of affine motion to determine the current block 912 follows. Assuming that the prediction for the current block 912 is P, P can be predicted from Reference Frame 0 904 and Reference Frame 1 906. The current block 912 has affine motion with respect to Reference Frame 0 904 and Reference Frame 1 906 that is described by MV0 920 and MV1, respectively. The following equations describe a manner in which P can be predicted from Reference Frame 0 904 and Reference Frame 1 906:

$$P=P_0(MV_0)$$

$$P=P_1(MV_1)$$

In the above equations, $P_0$ represents the first block 914 in Reference Frame 0 904 and $P_1$ represents the second block 916 in Reference Frame 1 906.

The temporal position of P in Reference Frame 0 904 can be designated T0. The first-order Taylor expansion of P at T0 can be determined using the following equation:

$$P = P_0 + \frac{\partial P_0}{\partial t} \cdot (t-t_0) = \qquad \text{Equation (2)}$$

$$P_0 + \frac{\partial P_0}{\partial x} \cdot \frac{\partial x}{\partial t} \cdot (t-t_0) + \frac{\partial P_0}{\partial y} \cdot \frac{\partial y}{\partial t} \cdot (t-t_0)$$

To solve Equation (2), $$G_{x0} = \frac{\partial P_0}{\partial x} \text{ and } G_{y0} = \frac{\partial P_0}{\partial y}$$

can represent the gradient in the x-direction and the y-direction, respectively, at $P_0$. Additionally, $$\left(V_{x0} = \frac{\partial x}{\partial t} \cdot (t-t_0), V_{y0} = \frac{\partial y}{\partial t} \cdot (t-t_0)\right)$$

can represent the motion at T0, as defined by the affine motion model. Using these representations, Equation (2) can become:

$$P=P_0+G_{x0} \cdot V_{x0}+G_{y0} \cdot V_{y0} \qquad \text{Equation (3)}$$

In some examples, affine motion ($V_{x0}$, $V_{y0}$) can be represented by a 4-parameter affine model, as follows:

$$\begin{cases} V_{x0} = S \cdot \cos\phi \cdot x - x - S \cdot \sin\phi \cdot y + c \\ V_{y0} = S \cdot \sin\phi \cdot x + S \cdot \cos\phi \cdot y - y + d \end{cases}$$

In the above equation, S denotes a homogenous scaling factor, ϕ represents rotation, and c and d are translational motion vectors. In other examples, a 6-parameter or 8-parameter affine model can be used.

For convenience, let a=cos ϕ and b=sin ϕ, in which case the above equation becomes:

$$\begin{cases} V_{x0} = S \cdot a \cdot x - x - S \cdot b \cdot y + c \\ V_{y0} = S \cdot b \cdot x + S \cdot a \cdot y - y + d \end{cases} \qquad \text{Equation (4)}$$

When the current block 912 is temporally equidistant from Reference Frame 0 904 and Reference Frame 1 906, the motion ($V_{x0}$, $V_{y0}$) can be determined using the following equation:

$$\begin{cases} V_{x1} = \frac{1}{S} \cdot \cos(-\phi) \cdot x - x - \frac{1}{S} \cdot \sin(-\phi) \cdot y - c = \frac{1}{S} \cdot a \cdot x - x + \frac{1}{S} \cdot b \cdot y - c \\ V_{y1} = \frac{1}{S} \cdot \sin(-\phi) \cdot x + \frac{1}{S} \cdot \cos(-\phi) \cdot y - y - d = \frac{-1}{S} \cdot b \cdot x + \frac{1}{S} \cdot a \cdot y - y - d \end{cases}$$

In the above, the rotation angle and translational motion are assumed to be mirrored between Reference Frame 0 904 and Reference Frame 1 906, while the scaling factor is assumed to be reciprocal.

Similarly, the temporal position of P in Reference Frame 1 906 can be designated T1. The first-order Taylor expansion of P at T1 can be determined using the following equation:

$$P=P_1+G_{x1} \cdot V_{x1}+G_{y1} \cdot V_{y1} \qquad \text{Equation (5)}$$

Because the above equations are being applied in bilateral matching, affine parameters S, a, b, c, and d can be derived by minimizing the sum of squared error between Equation (3) and Equation (5), which can be expressed mathematically as follows:

$$\{V_{x0}, V_{y0}, V_{x1}, V_{y1}\} = \arg \min\{\Sigma_{block}((P_0+G_{x0} \cdot V_{x0}+G_{y0} \cdot V_{y0})-(P_1+G_{x1} \cdot V_{x1}+G_{y1} \cdot V_{y1}))^2\} \qquad \text{Equation (6)}$$

Mathematically, S can be difficult to solve. In practice, values of S can be restricted to a certain range, and a, b, c, and d at a given value of S can be solved. A combination of {S, a, b, c, d} leading to minimal sum of squared error can be used to describe the affine motion for a block. Alternatively, methods described below (regarding a feature point-based method for providing an initial estimate of the scaling factor) can be used to find an approximated value for S.

Figure 10:
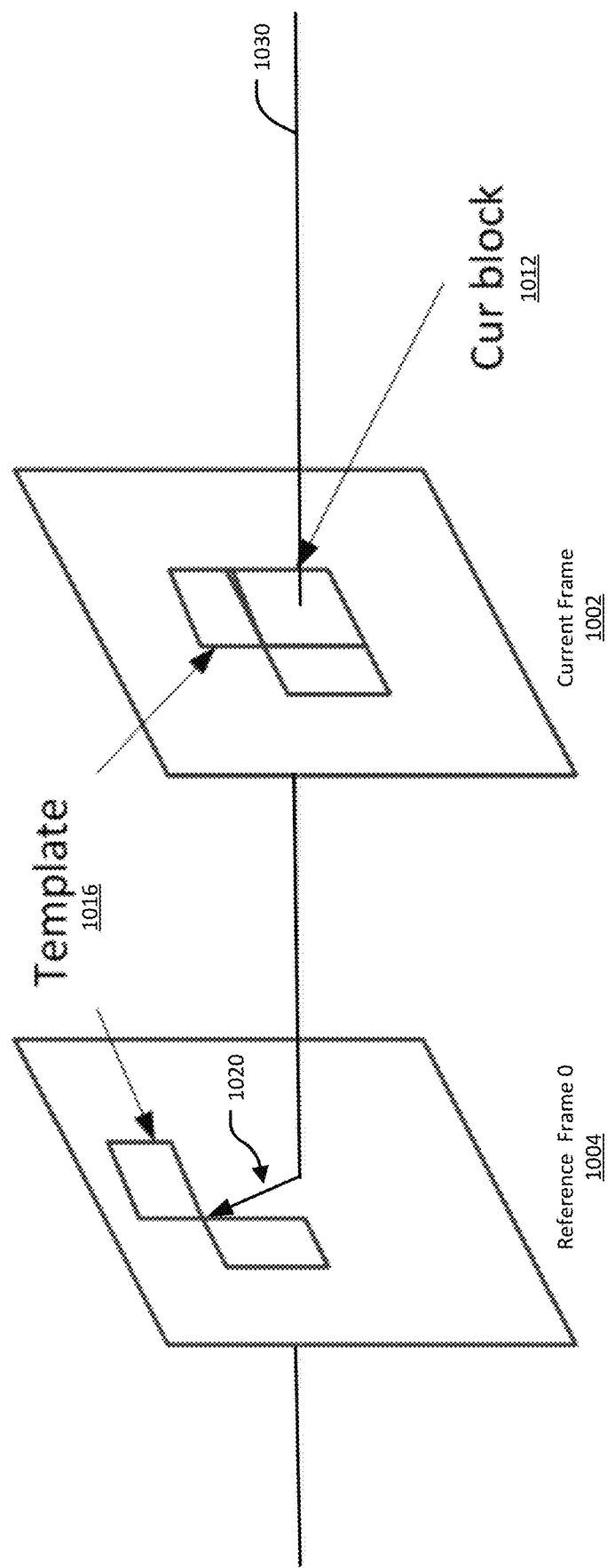
FIG. 10 illustrates an example of template matching.

FIG. 10 illustrates an example of template matching. In template matching, a template 1016 can be used to derive motion information from a reference frame, Reference Frame 0 1004. For example, the template 1016 can include top and/or left neighboring blocks of a current block 1012 in a current frame 1002. In this example, a set of blocks can be found in Reference Frame 0 1004 that best match the template 1016, where the set of blocks are the same size and/or configuration as the template 10160. A motion vector 1020 can then be determined, using the location of the set of blocks and a relative location of the current block 1012 in Reference Frame 0 1004. The relative location of the current block 1012 can be determined from an orthogonal axis 1030 through, for example, the center of the current block 1012.

At an encoder, whether to use FRUC merge mode for a CU can be based on a rate distortion cost selection, as done, for example, for a normal merge candidate. That is, a rate distortion cost can be determined for each of the two matching modes (e.g., bilateral matching and template matching) for a given CU. The matching mode that has the lowest cost can further be compared to other CU modes. When a FRUC matching mode has the lowest cost, a FRUC flag can be set to indicate that FRUC merge mode should be used for a CU. Additionally, the matching mode to be used can also be indicated.

Local Illumination Compensation (LIC) is process by which changes in illumination between on frame and a subsequent frame can be accommodated when determining a reference block. For example, in a video, a camera flash may have occurred, such that an object in a first frame is illuminated more brightly in a second frame. In this example, the illumination change (e.g., the camera flash) can cause pixel value differences for the same object. When the illumination change is not accommodated, locating a reference block in the second frame may be difficult. LIC assumes, for example, that a constant pixel value was added to the second frame. Under this assumption, a reference block can be found more easily.

LIC can be based on a linear model for illumination changes, and can use a scaling factor a and an offset b. For instance, the scaling factor and the offset can be used to compensate for the discrepancy induced by illumination changes in a picture. The scaling factor can be used, for example, to scale the pixel values for a reference block. For example, the scaling factor can be multiplied by the prediction samples generated from a reference block. The offset can, for example, be used to indicate the set of pixels that were used to determine the scaling factor. In some cases, the offset can indicate the average luminance change from a non-illuminated version of the picture. LIC can be enabled or disabled adaptively for each inter-coded CU.

The following equation provides an example of a linear illumination compensation model that can be used in inter-view prediction:

$$P(i,j)=a*r(i+dv_x, j+dv_y, +b), \text{ where } (i,j) \in PU_c$$

In the above equation, PUc is the current prediction unit, (i, j) is the coordinates of pixels in PUc, and (dvx, dvy) is the disparity vector of PUc. The result of p(i, j) is the prediction of PUc, where r is the prediction unit's reference picture from neighboring view. a and b are parameters of the linear IC model.

When LIC applies to a CU, a least square error method can be used to derive a and b. For example, the least square method can use neighboring samples of a current CU and reference samples corresponding to the neighboring samples.

Figure 11:
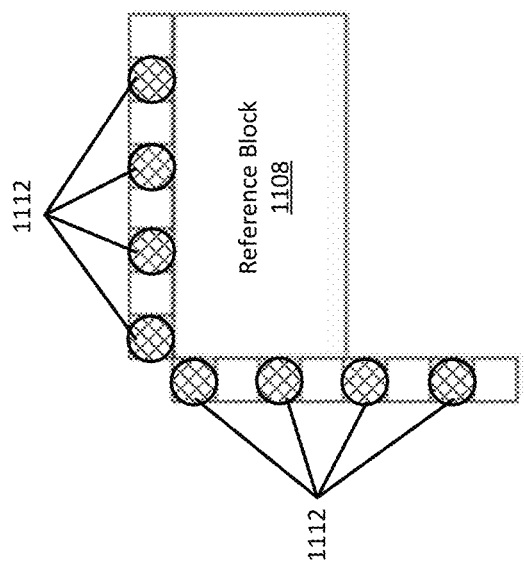
FIG. 11 illustrates an example of using neighboring samples to derive illumination compensation parameters.
Figure 11:
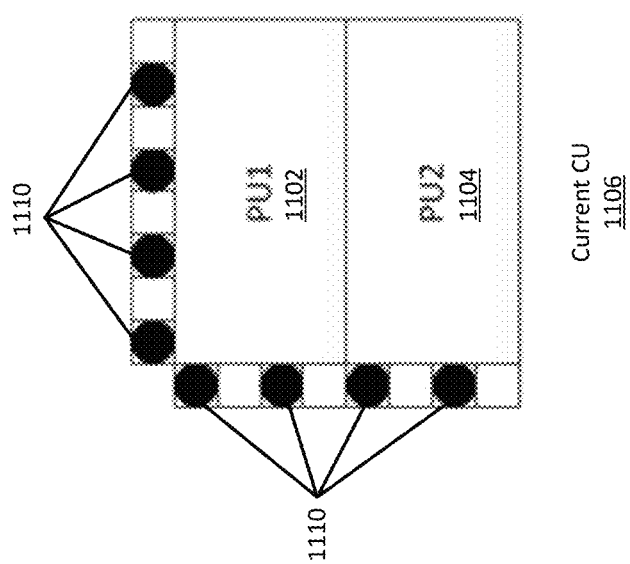

FIG. 11 illustrates an example of using neighboring samples to derive illumination compensation parameters. In the illustrated example, neighboring samples 1110 of a current CU 1106 can be determined. In some examples, the neighboring samples 1110 are subsampled, for example using 2:1 sub sampling. The corresponding samples 1112 (e.g., neighboring samples of a reference block 1108) can be used to determine illumination compensation parameters. The illumination compensation parameters can be derived and applied separately for each prediction direction.

In the illustrated example, the current CU 1106 is subdivided into two PUs, PU1 1102 and PU2 1104. Also in this example, the reference block 1108 is a reference block for PU1 1102, determined for list 0 using motion information for the current CU 1106 or for a sub-CU.

To estimate the parameters a and b for a PU, two set of pixels can be used: first available reconstructed neighboring pixels in left column and above row of current CU (the CU that contains current PU), and second corresponding neighboring pixels of current CU's reference block. Reference block of current CU can be found by using current PU's disparity vector. Using FIG. 11 as an example, the neighboring samples 1110 of the current CU 1106 can be designated $Rec_{neig}$ and the neighboring samples 1112 of the reference block 1108 can be designated $Rec_{refneig}$. Additionally, 2N can denote a pixel number in $Rec_{neig}$ and $Rec_{refneig}$. The parameters a and b can then be calculated using the following equations:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2}$$

$$b = \frac{\sum_{i=0}^{2N-1} Rec_{neig}(i) - a \cdot \sum_{i=0}^{2N-1} Rec_{refneig}(i)}{2N}$$

When a CU is coded with merge mode, an LIC flag can be copied from neighboring blocks. For example, the manner in which motion information is copied in merge mode can be used. When a CU is not coded with merge mode, an LIC flag can be signaled for the CU to indicate whether LIC applies to the CU.

In some cases, LIC and FRUC processes, when both enabled, may conflict or may cause unnecessary computational complexity. For example, when bilateral matching coding mode (illustrated, for example, in FIG. 9) is used for motion vector derivation for a frame rate up-conversion coding mode, an illumination change may have occurred in that later reference frame. In this example, the illumination change may not be accurately compensated for in the frame generated as a result of the frame rate up-conversion coding mode. For example, it may not be evident whether pixel values from before the illumination change or after the illumination change are more suitable for the generated frame.

In various implementations, conflicts and/or complexity caused by enabling both LIC and FRUC bilateral matching can be solved by allowing only one or the other process to be used for a block or CU. Whether FRUC bilateral matching coding mode or LIC is enabled can depend on the order of associated flags included in a bitstream. For example, in some implementations, when a flag that indicates that FRUC is enabled appears before a flag that indicates whether LIC is enabled, and FRUC bilateral matching coding mode is also enabled, the LIC flag is either set to "disabled" by an encoder and/or is ignored by a decoder. Alternatively or additionally, the LIC flag can be not signaled, meaning left out of the bitstream entirely. As another example, in some implementations, when a flag that indicates that LIC is enabled appears before a flag that indicates FRUC is enabled, then a flag enabled FRUC bilateral matching coding mode may be set to "disabled" by an encoder and/or a decoder can assume that FRUC bilateral matching coding mode cannot be used. Alternatively or additionally, the FRUC bilateral matching coding mode flag can be not signaled in the bitstream.

In HEVC, in some cases, only a translational model may be applied for motion compensation prediction. A translational model assumes linear motion. In many cases, however, a video can include many, non-linear motions, such as zoom-in, zoom-out, rotation, perspective motion, and/or other irregular, non-linear motion. In the Joint Exploration Model (JEM), a simplified affine transform motion compensation prediction can be applied to accommodate non-linear motion and improve coding efficiency. JEM is a project of the International Telecommunications Union Video Coding Experts Group (ITU-VCEG) and the International Standards Organization/International Electrotechnical Commission Motion Picture Experts Group (ISO/IEC MPEG). JEM provides a platform for studying and potentially standardizing video coding technology that has better compression capability than HEVC.

Figure 12:
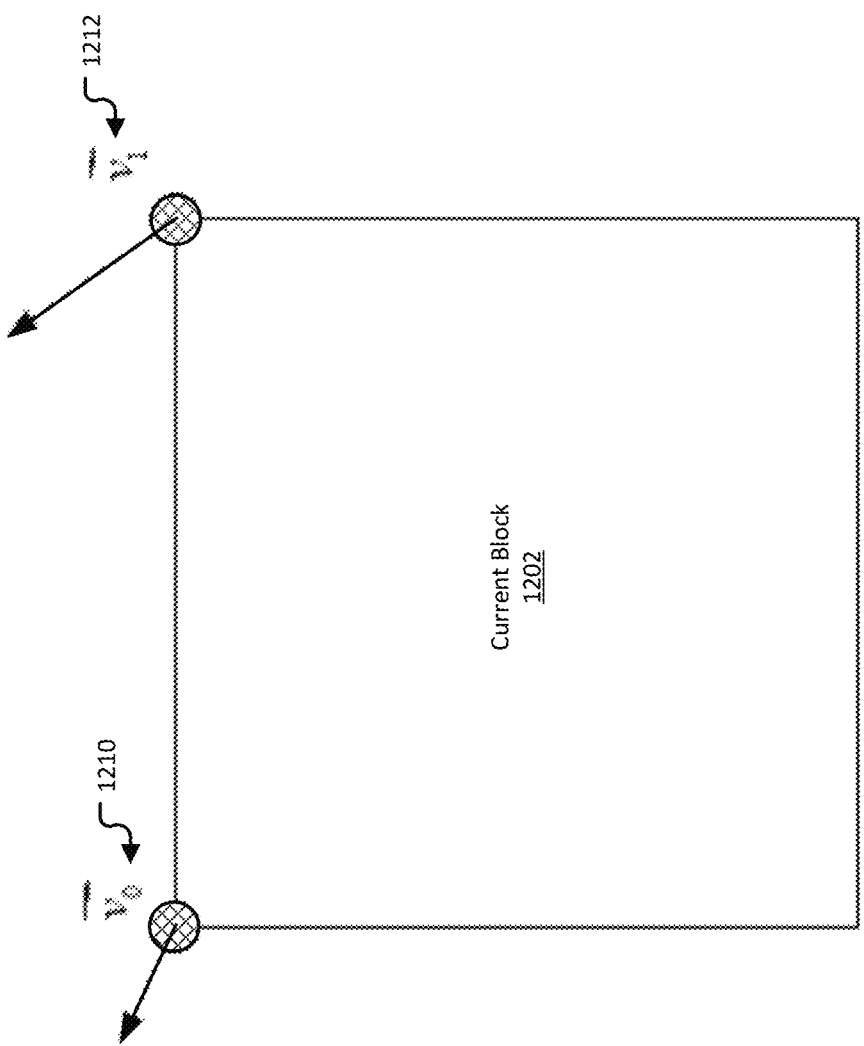
FIG. 12 illustrates an example of a simplified affine motion model for a current block.

FIG. 12 illustrates an example of a simplified affine motion model for a current block 1202. The current block 1202 can be, for example, in a frame being generated through use of a frame rate up-conversion coding mode.

In the example illustrated in FIG. 12, affine motion of a current block 1202 can be described by two control point vectors, $v_0$ 1210 and $v_1$ 1212. In the illustrated example, $v_0$ 1210 is determined from the upper left corner of the current block 1202 and the $v_1$ 1212 is determined from the upper right corner of the current block 1202. Each control point vector can include two values, a horizontal value and a vertical value, thus each control point vector can provide two control points. Additional control points (e.g., six control points or eight control points or some other number of control points) can be defined by adding additional control point vectors, for example at the lower corners of the current block 1202 and/or the center of the current block 1202.

The control point vectors can be determined using, for example, bilateral matching, assuming the possibility of non-linear motion. For example, between a first reference frame and a second reference frame, an object may have rotated 10 degrees. In this example, assuming continuous motion, the degree of rotation for the current block 1202 can be assumed to be 5 degrees. In this example, the control point vectors can be generated accordingly.

In various examples, the two control point vectors can be used to determine a motion vector field (MVF) for the current block 1202. Equation (1) illustrates a method by which the motion vector field can be determined.

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}$$ Equation (1)

In Equation (1), $(v_{0x}, v_{0y})$ is a motion vector for the top-left corner control point (e.g., the motion vector describing vector $v_0$ 1210) and $(v_{1x}, v_{1y})$ is the motion vector for the top-right control point (e.g., the motion vector describing vector $v_1$ 1212). Equation (1) can be used to compute a motion vector $(v_x, v_y)$ for a pixel at position (x, y). In examples where more than two control point vectors are used, Equation (1) can be expanded accordingly.

Computing a motion vector for each pixel in the current block 1202 can capture more detailed motion information, and thus can produce better frame rate up-conversion results. For example, a video may capture a foot race, in which a number of people are moving in the same general direction. In this example, the general motion of the group can be captured by the control point vectors, and/or by a translational motion vector for the whole bock. Within the group, however, individual people may be moving in moderately different directions with respect to the general direction of the group. A motion vector field, in which motion vectors are computed for each pixel of the block, can captured these variations in motion.

Figure 13:
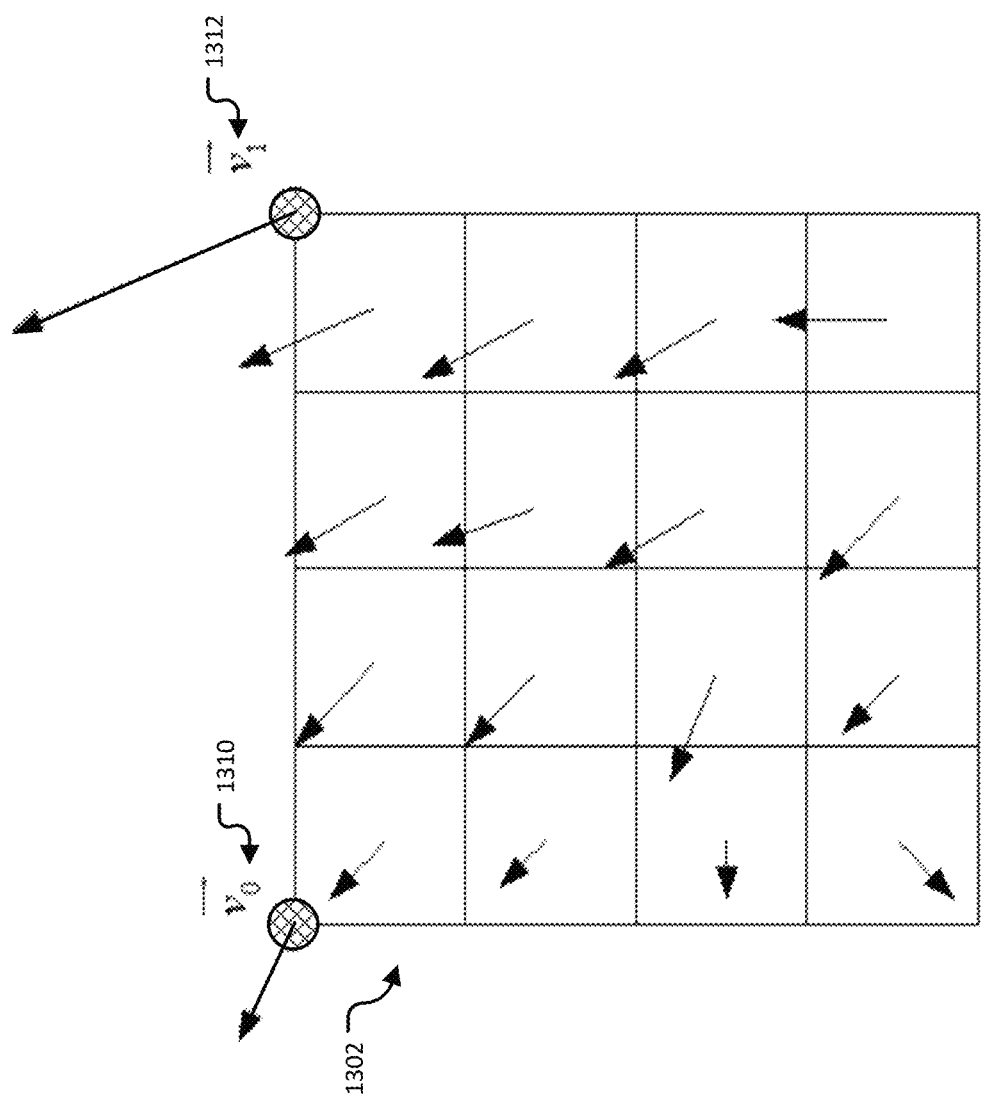
FIG. 13 illustrates an example of a motion vector field determined using sub-blocks of a block.

Computing a motion vector for each pixel in a block, however, can be computationally demanding. To simplify the computation, block-based affine transform prediction can be applied. FIG. 13 illustrates an example of a motion vector field determined using sub-blocks of a block 1302. The block 1302 can be, for example, in a frame that is being generated through use of a frame rate up-conversion coding mode.

In the example of FIG. 13, the block 1302 has been divided into 4×4 sub-blocks. A motion vector of each sub-block has been determined using a first control point vector, $v_0$ 1310, and a second control point vector, $v_1$ 1312. In this example, $v_0$ 1310 is based at the upper left corner of the block 1302 and $v_1$ 1312 is based at the upper right corner of the block 1302. In the illustrated example, the motion vector for each sub-block has been computed for a center sample of each sub-block, using Equation (1). In some examples, the resulting $(v_x, v_y)$ values can be rounded to 1/16 fractional accuracy. The motion vector of each sub-block can be used to generate a prediction for each sub-block.

In some examples, after motion compensation prediction, the high accuracy motion vector of each sub-block can be rounded and saved with the same accuracy as the normal motion vector.

In some examples, including JEM, affine motion models can include two modes: affine inter mode (referred to herein as AF_INTER mode) and affine merge mode (referred to herein as AF_MERGE mode).

Figure 14:
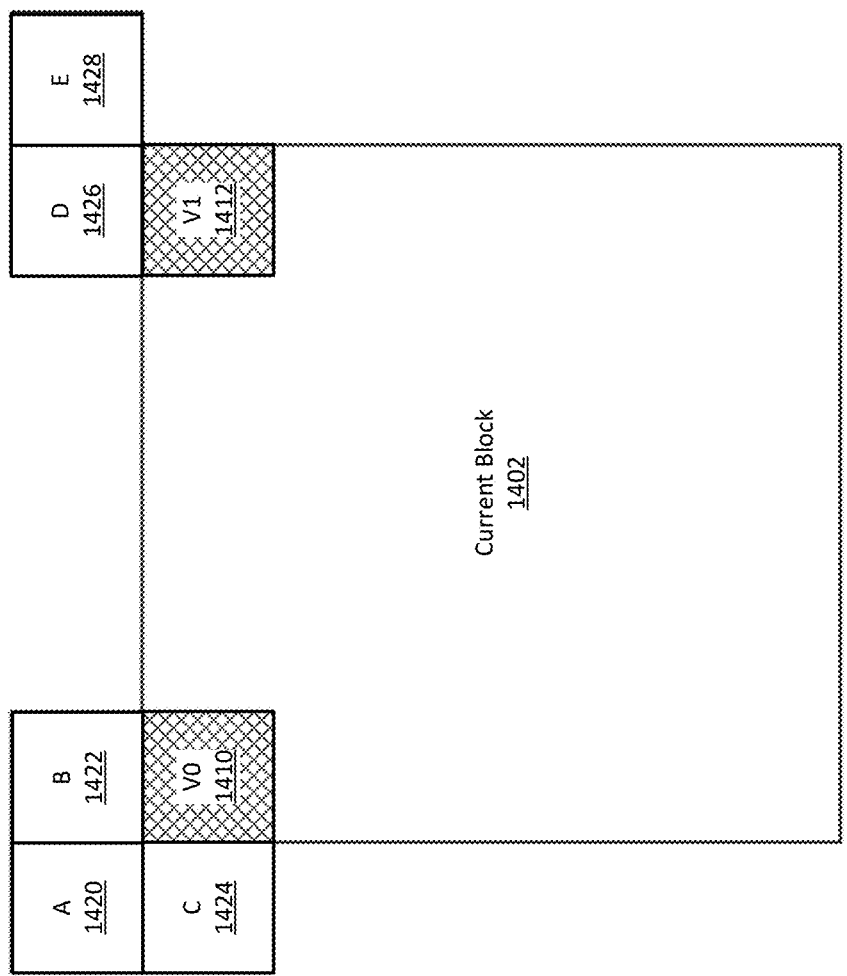
FIG. 14 illustrates an example of motion vector prediction in AF_INTER mode.

FIG. 14 illustrates an example of motion vector prediction in AF_INTER mode. In some examples, when a CU has a width and height larger than 8 pixels, AF_INTER mode can be applied. An affine flag can be placed in the bitstream, at the CU level, to indicate whether AF_INTER mode was applied to the CU.

As illustrated in the example of FIG. 14, in AF_INTER mode, a candidate list of motion vector pairs can be constructed using neighboring blocks. For example, for a sub-block, V0 1410, located in the upper left corner of a current block 1402, a motion vector $v_0$ can be selected from neighboring blocks A 1420, B 1422, and C 1424, in the above and left, above, and left directions, respectively. As a further example, a sub-block, V1 1412, located in the upper right corner of the current block 1402, a motion vector $v_1$ can be selected from neighboring blocks D 1426 and E 1428 in the above and the above right directions, respectively. Given motion vectors $v_A$, $v_B$, $v_C$, $v_D$, and $v_E$ corresponding to blocks A 1420, B 1422, C 1424, D 1426, and E 1428, the candidate list of motion vector pairs can be expressed as $\{(v_0, v_1)|v_0=v_A, v_B, v_C\}, v_1=\{v_D, v_E\}\}$. In some examples, a motion vector from a neighboring block can be scaled based on the relationship between the POC of the reference picture for the neighboring block, the POC of the reference picture for the current CU, and the POC of the current CU. In these examples, some of the POCs can be determined from a reference list.

In some examples, when the number of candidates in a candidate list is less than two, the candidate list can be padded with motion vector pairs composed by duplicating each of the AMVP candidates. When the candidate list is greater than two, in some examples, the candidates in the candidate list can be sorted according to the consistency of the motion vectors for the candidate (e.g., according to a degree of similarity between the two motion vectors of the pair of motion vectors associated with the candidate). In these examples, the first two candidates are kept and the rest may be discarded.

In some examples, a rate distortion cost check can be used to select a motion vector pair candidate from among the candidates in the list. The selected motion vector pair candidate can be used as for control point motion vector prediction (CPMVP) for the current block 1402. In some cases, an index indicating the position of the selected motion vector pair candidate can be indicated in a bitstream. Once the motion vector pair candidate is selected for the current block 1402, affine motion estimation can be applied, and a control point motion vector (CPMV) can be found. In some cases, the difference between the control point motion vector and the control point motion vector prediction can be signaled in the bitstream.

Figures 15A, 15B:
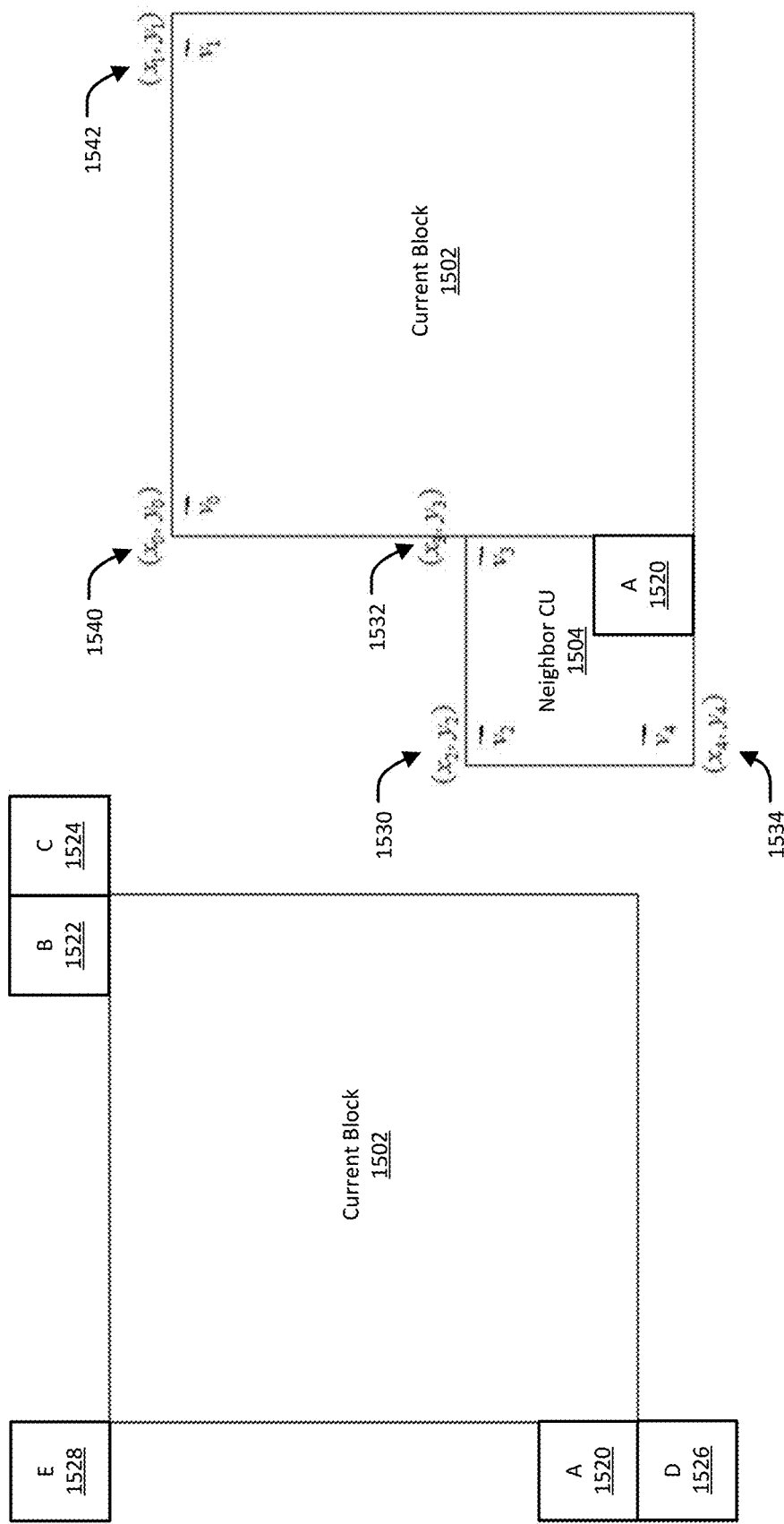
FIG. 15A and FIG. 15B illustrate an example of motion vector prediction in AF_MERGE mode.

FIG. 15A and FIG. 15B illustrate an example of motion vector prediction in AF_MERGE mode. When AF_MERGE mode is applied to a current block 1502, a motion vector can be obtained from a valid neighboring reconstructed block. As illustrated in FIG. 15A, the neighboring block can be selected from among a set of neighboring blocks, here labeled A 1520, B 1522, C 1524, D 1526, and E 1528. The neighboring blocks may be considered in a particular order, such as, for example, the left neighbor (block A 1520), followed by the above neighbor (block B 1522), then the above right neighbor (block C 1524), then the left bottom neighbor (block D 1526), and then the above left neighbor (block E 1528).

The neighboring block that is selected is the first that has been coded with affine mode. For example, block A 1520 may have been coded in affine mode. As illustrated in FIG. 15B, block A 1520 can be included in a neighboring CU 1504. For the neighboring CU 1504, motion vectors for the top left corner ($v_2$ 1530), above right corner ($v_3$ 1532), and left bottom corner ($v_4$ 1534) may have been derived. In this example, a control point motion vector, $v_0$ 1540, for the top left corner of the current block 1502 and a control point motion vector, $v_1$ 1542, for the top right corner of the current block 1502 can be determined with an affine motion formula, an example of which is:

$$\begin{cases} v_{0x} = v_{2x} + \frac{(v_{4x} - v_{2x})}{(y_4 - y_2)} \cdot (y_0 - y_2) + \frac{(v_{3x} - v_{2x})}{(x_3 - x_2)} \cdot (x_0 - x_2) \\ v_y = v_{2y} + \frac{(v_{4y} - v_{2y})}{(y_4 - y_2)} \cdot (y_0 - y_2) + \frac{(v_{3y} - v_{2y})}{(x_3 - x_2)} \cdot (x_0 - x_2) \end{cases}$$

$$\begin{cases} v_{1x} = v_{2x} + \frac{(v_{4x} - v_{2x})}{(y_4 - y_2)} \cdot (y_1 - y_2) + \frac{(v_{3x} - v_{2x})}{(x_3 - x_2)} \cdot (x_1 - x_2) \\ v_{1y} = v_{2y} + \frac{(v_{4y} - v_{2y})}{(y_4 - y_2)} \cdot (y_1 - y_2) + \frac{(v_{3y} - v_{2y})}{(x_3 - x_2)} \cdot (x_1 - x_2) \end{cases}$$

The above equations illustrate an example method for using $v_2$ 1530, $v_3$ 1532, and $v_4$ 1534 to compute $v_0$ 1540 and $v_1$ 1542.

Once the control point motion vectors, $v_0$ 1540 and $v_1$ 1542, have been determined, Equation (1) can be applied to determine a motion vector field for the current block 1502.

In order to identify whether the current block 1502 is coded with AF_MERGE mode, an affine flag can be included in the bitstream when there at least one neighboring block was coded in affine mode.

In various implementations of frame rate up-conversion coding modes, translation motion is considered when determining motion estimation. For example, some implementations of JEM only use translational motion models. Translational motion models, however, may not be able to capture more complex motions, or may not be able to capture such motions efficiently. For example, signaling (e.g., describing) complex motions in a bitstream, using only translational motion models, may generate very large bitstreams. The signals may be necessary for a decoder to be able to execute frame rate up-conversion and produce video sequences that have minimal glitches or artifacts. Large bitstreams, however, can be costly to store and to transport.

In various implementations, when using frame rate up-conversion bilateral matching coding mode, an affine motion model can be applied instead of or in addition to a translational motion model. In some cases, an affine motion model can better reflect the movement of an object from frame to the next, and thus lead to better frame rate up-conversion results.

In some examples, when using bilateral matching for a whole block, a translational motion model can first used to derive translational motion information. For example, motion estimation and motion prediction, as discussed, for example, with respect to FIG. 2A and FIG. 2B, can be used to determine a motion vector and a reference index to a reference frame. The translational motion information can then be used as input into an affine motion model, to derive affine motion information. For example, the translational motion information can provide a single motion vector for a current block. In this example, an affine motion model, as discussed above, can be applied to the motion vector to produce a motion vector field for the block.

In some implementations, a matching cost can be determined for both the translational motion information and the affine motion information, to determine which information to include in a bitstream. The matching cost can correlate to the degree of accuracy of each model. Determining a matching cost can include, for example, comparing a block from a first reference frame with a block from a second reference frame, where the two blocks are selected based on the motion model. For a translational motion model, the movement of an object can be assumed to be linear, and thus the second block can be assumed to be along a continuous trajectory with respect to the first block. For an affine motion model, the movement of the object may assumed to be non-linear, and thus the second block may be in a different part of the second reference frame than the block selected using the translational motion model. When the difference between the first block and the second block is great, the matching cost is high. Conversely, when the differences are few, then the matching cost is low. In various implementations, the motion information that results in the smaller matching cost is used.

In some implementations, the affine motion model is checked only for some blocks. For example, blocks that are larger than a threshold size (e.g., 4×4 pixels, 16×16 pixels, or some other size) may be checked. In some cases, affine motion models can provide better results (e.g., more efficient coding) for bigger blocks. In some examples, the threshold can be determined using machine learning techniques, in which an encoding system can be provided with training samples and the system can try different thresholds until an optimum is determined. In some implementations, the threshold can be predefined, or the threshold can be signaled in a bitstream. For example, the threshold may be indicated in the SPS, the PPS, the slice header, in a Supplemental Enhanced Information (SEI) message, or in some other structure in the bitstream.

In various implementations, an encoder can determine whether translational motion information or affine motion information should be used for any particular coding unit. In these implementations, the encoder can indicate or signal in the bitstream the method used to derive the motion information. In various implementations, a decoder can use the information in the bitstream to derive the motion information.

In various implementations and as discussed above, when decoding a block coded in frame rate up-conversion mode, a block being generated can be subdivided into sub-blocks. In these implementations, a motion vector for the block can be used to generate motion vectors for each sub-block. Generating motion vectors for sub-blocks can capture more complex movement in the overall block, and thus produce better coding efficiency. The motion vector for the block can be determined using a translational motion model or an affine motion model. The motion vector for each sub-block can be determined using a translational motion model or an affine motion model. For example, Equation (1) above can be used to determine the motion vector for each sub-block.

In various implementations, a feature point-based method can be used to determine an initial scaling factor, where the scaling factor can be used to determine the motion vectors for sub-blocks. For example, in an example where a four-point affine model is being used, a Harris corner detector or some other computer vision system can be used to extract the most salient two feature points in a block. A feature point can be a distinctive set of pixels in a block, where the pixels are distinctive because the pixels have a different color or luminosity from surrounding and/or have a distinctive shape.

In various implementations, feature points can be used when searching for a best matching block during motion vector prediction. For example, search methods such as normalized cross correlation can be used to find corresponding feature points in a first reference picture and a second reference picture. A scaling factor can be determined by calculating, for example, the ratio of the Euclidean distances of the two feature points in the first reference picture and the second reference picture. Alternatively, when, for example, the number of salient feature points is greater than two, the ratio can be found by finding the least square value that fits a distance vector, where the distance vector can be generated by calculating the sum of the distance of each feature point to an averaged point (e.g., a distance to the center of mass). The calculated scaling factor can be used to refine the motion vectors for all sub-block.

In various implementations, a system may be configured to conduct pixel-level affine motion estimation when conducting frame rate up-conversion bilateral matching coding mode. In these implementations, a set of feature points can be extracted, and a least square solution to a system of linear equations can be used to derive affine parameters. Alternatively or additionally algorithms such as Random Sample Consensus (RANSAC) may be used to find the affine parameters. Algorithms such as RANSAC can automatically remove outliers during a search for affine parameters, where methods such as the least-square solution may include outliers. Algorithms such as RANSAC can also produce more robust results at the expense of additional computational complexity.

In various implementations, a video system may support weighted bi-interpolation. In non-weighted bi-prediction, a predicted reverse motion vector is given the same weight as a predicted forward motion vector. In weighted bi-prediction, the forward and reverse motion vectors can be given different weights. To determine the weights, the system can conduct an iterative search, where the search concludes when a stable result is achieved or a pre-determined maximum number of iterations is reached. A decoder, for example, may conduct an iterative search when the weights are not provided in a bitstream. In some cases, the weights may be provided in the bitstream, and can be used by the decoder to derive motion vectors.

Without some information about the contents of a video, however, determine the starting weight for the iterative search can be difficult. Thus, in various implementations, a translational motion search can be used to find the optimum weights. In these and other implementations, the weights can be applied to an affine motion search in bilateral matching.

In some implementations, when using frame rate up-conversion bilateral matching coding mode for sub-block motion vector refinement, first-order Taylor expansion can be used to optimize the motion vectors, instead of SAD-based matching. For example, first-order Taylor expansion for a current block can be computed for a first reference frame, and a first-order Taylor expansion for the current block can also be computed for a second reference frame, where the first and second reference frames are at different temporal positions. A motion vector can then be derived by minimizing a sum of a squared error (or a sum of absolute difference), where the error is between the results of the computations for each of the two reference frames. This computation is similar to Equation (6), discussed above.

Figure 16:
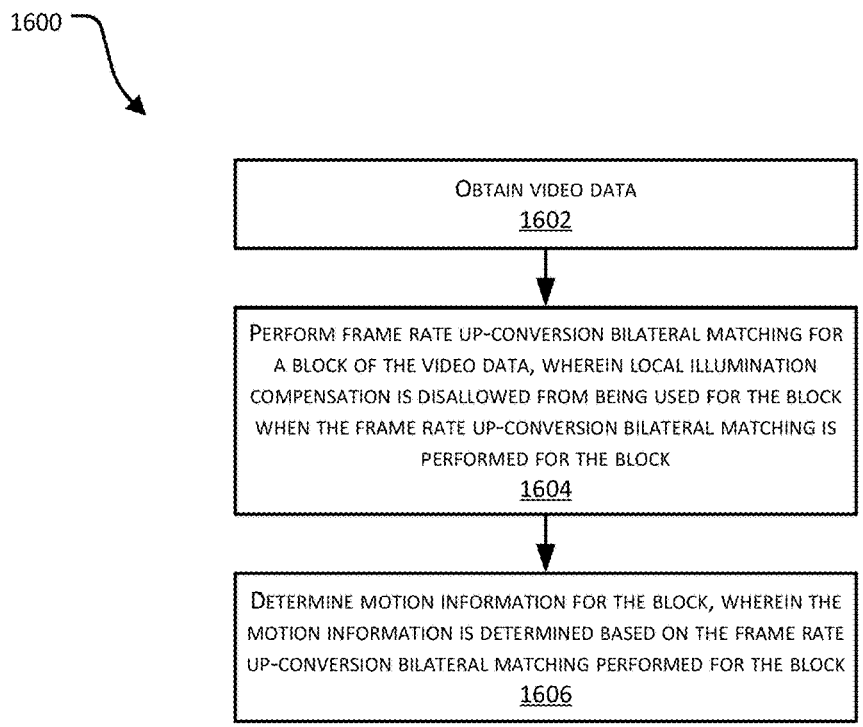
FIG. 16 illustrates an example of a process for frame rate up-conversion.

FIG. 16 illustrates an example of a process 1600 for frame rate up-conversion coding mode. The example process 1600 can be performed by an encoding device or a decoding device.

At 1602, the process 1600 includes obtaining video data. The video data can be obtained from, for example, a video capture device such as a camera. As another example, the video data can be obtained from an encoded bitstream. As another example, the video data can be obtained from a file or from network data, where the video data is packaged according to a particular format.

At 1604, the process 1600 includes using frame rate up-conversion bilateral matching coding mode for a block of the video data, wherein local illumination compensation is disallowed from being used for the block when the frame rate up-conversion bilateral matching coding mode is used for the block. In some implementations, when frame rate up-conversion bilateral matching coding mode is used for the block, a local illumination compensation flag is not signaled for the block when data for the block is written to a bitstream.

At 1606, the process 1600 includes determining motion information for the block, wherein the motion information is determined based on the frame rate up-conversion bilateral matching coding mode used for the block. The motion information can include, for example, a motion vector. Using frame rate up-conversion bilateral matching can include, for example, determining a first block in a first reference frame and determining a second block in a second reference frame, where the second block is associated with the first block. The process 1600 can further include determining a motion trajectory from the first block to the second block. The process 1600 can further include generating the block along a path of the motion trajectory.

In some implementations, when the process 1600 is performed by a decoder, the process 1600 can include deriving a value of the local illumination compensation flag to be false in response to the frame rate up-conversion bilateral matching coding mode being signaled for the block, wherein the local illumination compensation is not used when the local illumination compensation flag is derived to be false.

In some implementations, the process 1600 can further include performing a first-order Taylor expansion optimization to refine the motion information. Performing the first-order Taylor expansion optimization can include deriving a motion vector by minimizing a sum of squared error (or a sum of absolute difference) between first-order Taylor expansions of the block at temporal positions of a first references picture and a second reference picture.

Figure 17:
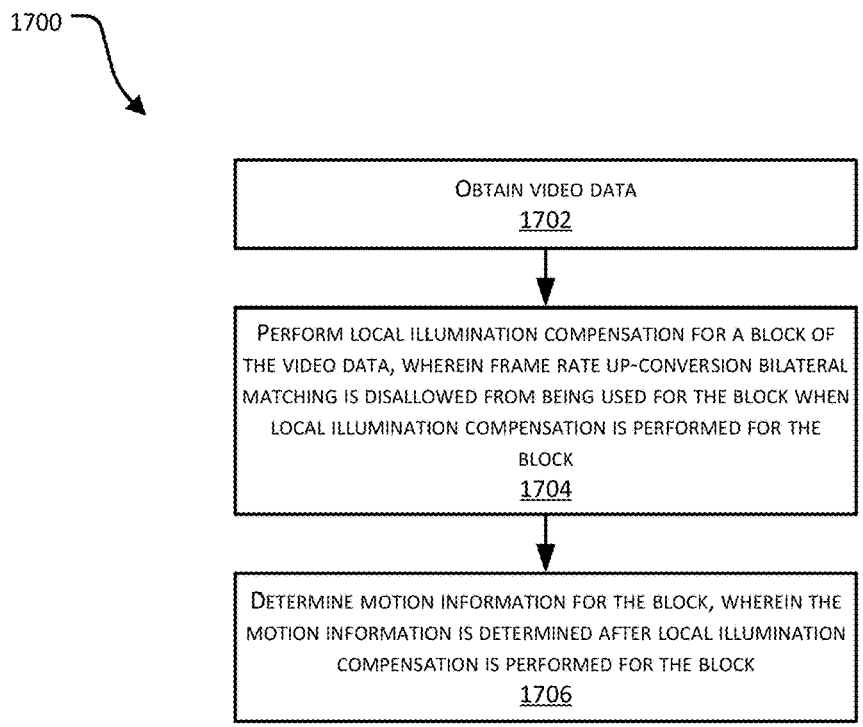
FIG. 17 illustrates an example of a process for frame rate up-conversion.

FIG. 17 illustrates an example of a process 1700 for frame rate up-conversion. The example process 1700 can be performed by an encoding device or a decoding device.

At 1702, the process 1700 includes obtaining video data. The video data can be obtained from, for example, a video capture device such as a camera. As another example, the video data can be obtained from an encoded bitstream. As another example, the video data can be obtained from a file or from network data, where the video data is packaged according to a particular format.

At 1704, the process 1700 includes using local illumination compensation for a block of the video data, wherein frame rate up-conversion is disallowed from being used for the block when the local illumination compensation is performed for the block. In some implementations, when local illumination compensation is used for the block, a frame rate up-conversion bilateral matching coding mode flag is not signaled for the block when data for the block is written to a bitstream.

At 1706, the process 1700 includes determining motion information for the block, wherein the motion information is determined after local illumination compensation is used for the block. In some implementations, using local illumination compensation can include using a least square method to derive a scaling factor and an offset.

In some implementations, when the process 1700 is performed by a decoder, the process 1700 can include deriving a value of the frame rate up-conversion bilateral matching coding mode flag to be false in response to local illumination compensation being signaled for the block, wherein the frame rate up-conversion bilateral matching is not used when the local illumination compensation flag is derived to be false.

In some implementations, the process 1700 can include performing a first-order Taylor expansion to refine the motion information.

Figure 18:
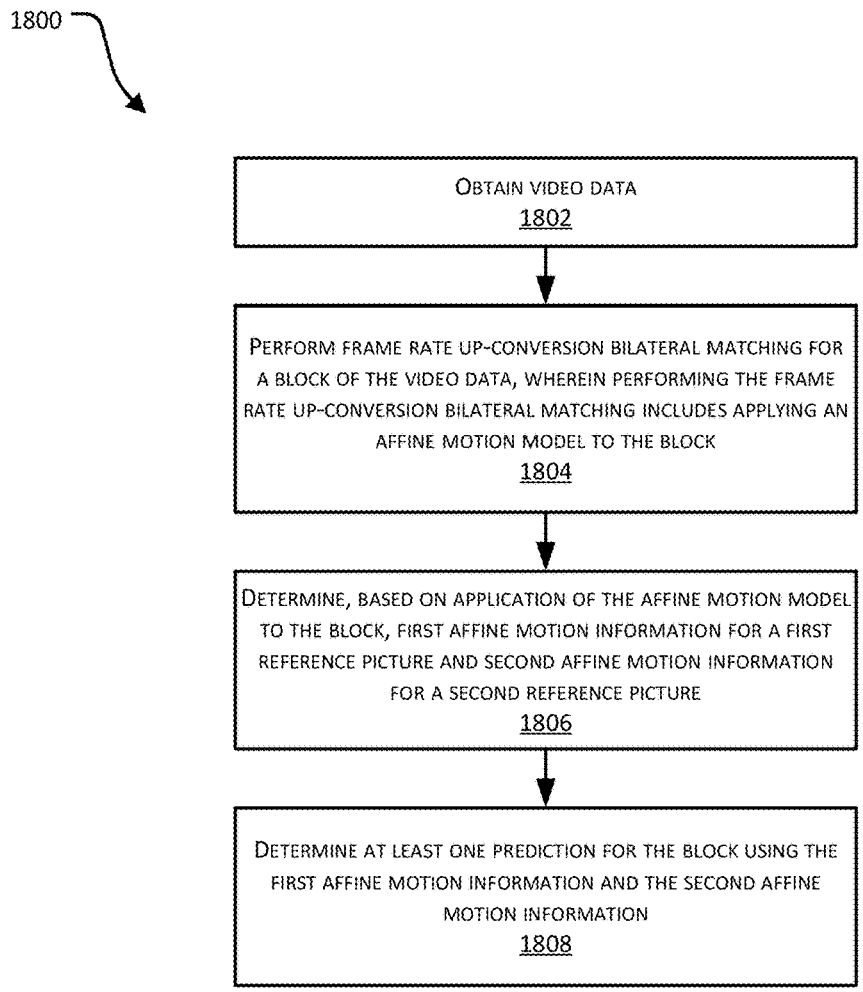
FIG. 18 illustrates an example of a process for frame rate up-conversion.

FIG. 18 illustrates an example of a process 1800 for frame rate up-conversion. The example process 1800 can be performed by an encoding device or a decoding device.

At 1802, the process 1800 includes obtaining video data. The video data can be obtained from, for example, a video capture device such as a camera. As another example, the video data can be obtained from an encoded bitstream. As another example, the video data can be obtained from a file or from network data, where the video data is packaged according to a particular format.

At 1804, the process 1800 includes using frame rate up-conversion bilateral matching coding mode for a block of the video data, wherein using the frame rate up-conversion bilateral matching includes applying an affine motion model to the block. In some cases, the affine motion model is applied instead of a translational motion model. In some cases, the affine motion model is applied in addition to a translational motion model.

At 1806, the process 1800 includes determining, based on application of the affine motion model to the block, first affine motion information for a first reference picture and second affine motion information for a second reference picture.

At 1808, the process 1800 include determining at least one prediction for the block using the first affine motion information and the second affine motion information.

In some implementations, the process 1800 can further include determining a first prediction for the block, where the first prediction is determined using the first reference picture and the first affine motion information. The process 1800 can further include determining a second prediction for the block, where the second prediction is determined using the second reference picture and the second affine motion information.

In some implementations, the process 1800 can further include applying a translational motion model to the block. Application of the translational motion model an result in translational motion information. In these implementations, applying the affine motion model to the block can include using the translational motion information is as input to derive the first affine motion and the second affine motion information.

In some implementations, the process 1800 can further include determining that a matching cost of the affine motion model is less than a matching cost of the translational motion model. When the matching cost is less, then use of the affine motion model can be signaled in a bitstream.

In some implementations, the process 1800 can further include determining that a matching cost of the affine motion model is greater than a matching cost of the translational motion model. When the cost is greater, then use of the translational motion model can be signaled in a bitstream.

In some implementations, the process 1800 can further include determining that a size of the block is greater than a threshold size. In these implementations, the affine motion model is applied to the block in response to determining the size of the block is greater than the threshold size.

In some implementations, the process 1800 can further include performing a first-order Taylor expansion optimization to refine the at least prediction for the block. Performing the first-order Taylor expansion optimization can include deriving a motion vector by minimizing a sum of squared error (or a sum of absolute difference) between first-order Taylor expansions of the block at temporal positions of the first reference picture and the second reference picture.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 19:
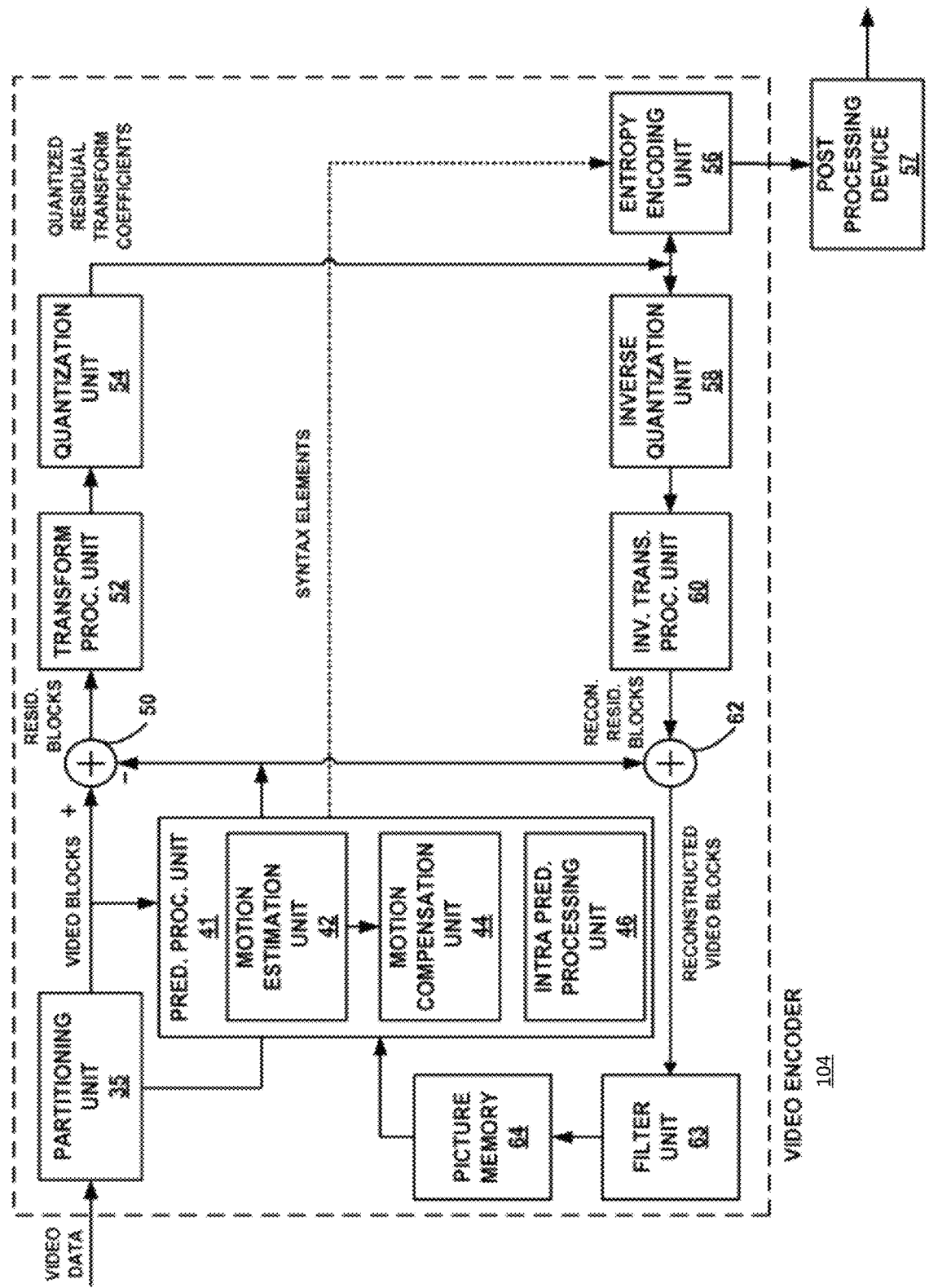
FIG. 19 is a block diagram illustrating an example encoding device.
Figure 20:
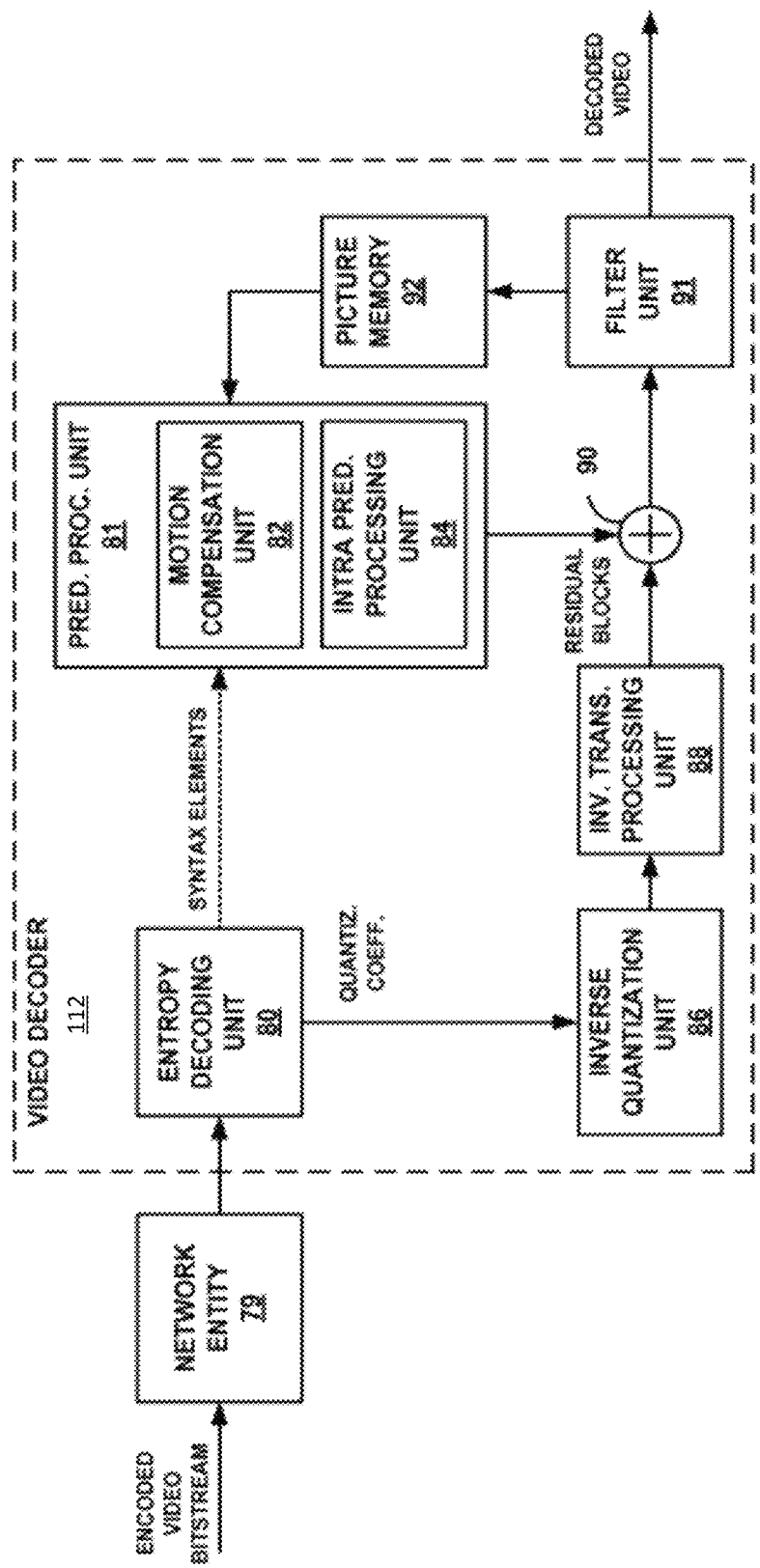
FIG. 20 is a block diagram illustrating an example video decoding device.

Specific details of the encoding device 104 and the decoding device 112 are shown in FIG. 19 and FIG. 20, respectively. FIG. 19 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 19 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 19, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 19 represents an example of a video encoder configured to generate syntax for a encoded video bitstream. The encoding device 104 may, for example, generate VPS, SPS, and PPS parameter sets as described above. The encoding device 104 may perform any of the techniques described herein, including the processes described above with respect to FIG. 17, FIG. 18, and FIG. 19. The techniques of this disclosure have generally been described with respect to the encoding device 104, but as mentioned above, some of the techniques of this disclosure may also be implemented by post processing device 57.

FIG. 20 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 20.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 20 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:
   obtaining the video data;
   determining frame rate up-conversion bilateral matching coding mode is enabled for a block of the video data;
   determining local illumination compensation is disabled from being used for the block in response to determining the frame rate up-conversion bilateral matching coding mode is enabled for the block;
   performing the frame rate up-conversion bilateral matching coding mode for the block;
   determining motion information for the block based on performing the frame rate up-conversion bilateral matching coding mode for the block; and
   determining an interpolated picture using the motion information determined for the block based on performing the frame rate up-conversion bilateral matching coding mode.

2. The method of claim 1, further comprising:
   coding all syntax elements in the video data associated with the block, wherein a local illumination compensation flag is not coded in the syntax elements for the block based on the frame rate up-conversion bilateral matching coding mode being used for the block.

3. The method of claim 1, wherein the motion information includes at least one motion vector.

4. The method of claim 1, wherein using frame rate up-conversion bilateral matching coding mode includes:
   determining a reference block in a reference frame;
   determining a motion trajectory from the block to the reference block; and
   generating an interpolated block for the interpolated picture along a path of the motion trajectory.

5. The method of claim 1, further comprising:
   decoding the block based on the determined motion information.

6. The method of claim 5, wherein frame rate up-conversation bilateral matching is signaled for the block, and further comprising:
   deriving a value of a local illumination compensation flag to be false in response to the frame rate up-conversion bilateral matching coding mode being signaled for the block, wherein the local illumination compensation is determined to be disabled based on the local illumination compensation flag being derived to be false.

7. The method of claim 1, further comprising:
   encoding the block based on the determined motion information.

8. The method of claim 1, further comprising:
   performing a first-order Taylor expansion optimization to refine the motion information.

9. The method of claim 8, wherein performing the first-order Taylor expansion optimization includes deriving a motion vector by minimizing a sum of squared error or a sum of absolute difference between first-order Taylor expansions of the block at temporal positions of a first references picture and a second reference picture.

10. An apparatus, comprising:
    a memory configured to store video data; and
    a processor configured to:
      obtain the video data;
      determine frame rate up-conversion bilateral matching coding mode is enabled for a block of the video data;
      determine local illumination compensation is disabled from being used for the block in response to determining the frame rate up-conversion bilateral matching coding mode is enabled for the block;
      perform the frame rate up-conversion bilateral matching coding mode for the block;
      determine motion information for the block based on performing the frame rate up-conversion bilateral matching coding mode for the block; and
      determine an interpolated picture using the motion information determined for the block based on performing the frame rate up-conversion bilateral matching coding mode.

11. The apparatus of claim 10, wherein the processor is further configured to:
    code all syntax elements in the video data associated with the block, wherein a local illumination compensation flag is not coded in the syntax elements for the block based on the frame rate up-conversion bilateral matching coding mode being used for the block.

12. The apparatus of claim 10, wherein frame rate up-conversation bilateral matching is signaled for the block, and wherein the processor is further configured to:
    deriving a value of a local illumination compensation flag to be false in response to the frame rate up-conversion bilateral matching coding mode being signaled for the block, wherein the local illumination compensation is determined to be disabled based on the local illumination compensation flag being derived to be false.

13. The apparatus of claim 10, wherein the processor is further configured to:
perform a first order Taylor expansion optimization to refine the motion information.

14. The apparatus of claim 10, further comprising:
a display for displaying the video data.

15. The apparatus of claim 10, wherein the apparatus comprises a mobile device with a camera for capturing pictures.

16. A method of processing video data, the method comprising:
obtaining the video data;
determining local illumination compensation is enabled for a block of the video data;
determining frame rate up-conversion bilateral matching coding mode is disabled from being used for the block in response to determining the local illumination compensation is enabled for the block;
performing the local illumination compensation for the block; and
determining motion information for the block based on performing the local illumination compensation for the block.

17. The method of claim 16, further comprising:
coding all syntax elements in the video data associated with the block, wherein a frame rate up-conversion bilateral matching coding mode flag is not coded in the syntax elements for the block based on local illumination compensation being used for the block.

18. The method of claim 16, wherein using local illumination compensation includes using a least square method to derive a scaling factor and an offset.

19. The method of claim 16, wherein the method is performed by a decoding device.

20. The method of claim 19, wherein local illumination compensation is signaled for the block based on the local illumination compensation being used for the block, and further comprising:
deriving a value for a frame rate up-conversion bilateral matching coding mode flag to be false in response to the local illumination compensation being signaled for the block, wherein frame rate up-conversion bilateral matching coding mode is determined to be disabled based on the frame rate up-conversion bilateral matching coding mode flag being derived to be false.

21. The method of claim 16, wherein the method is performed by an encoding device.

22. The method of claim 16, further comprising:
performing a first-order Taylor expansion optimization to refine the motion information.

23. The method of claim 22, wherein performing the first-order Taylor expansion optimization includes deriving a motion vector by minimizing a sum of squared error or a sum of absolute difference between first-order Taylor expansions of the block at temporal positions of a first references picture and a second reference picture.

24. An apparatus, comprising:
a memory configured to store video data; and
a processor configured to:
obtain the video data;
determine local illumination compensation is enabled for a block of the video data;
determine frame rate up-conversion bilateral matching coding mode is disabled from being used for the block in response to determining the local illumination compensation is enabled for the block;
perform the local illumination compensation for the block; and
determine motion information for the block based on performing the local illumination compensation for the block.

25. The apparatus of claim 24, wherein the processor is further configured to:
code all syntax elements in the video data associated with the block, wherein a frame rate up-conversion bilateral matching coding mode flag is not coded in the syntax elements for the block based on local illumination compensation being used for the block.

26. The apparatus of claim 24, wherein local illumination compensation is signaled for the block based on the local illumination compensation being used for the block, and wherein the processor is further configured to:
derive a value for a frame rate up-conversion bilateral matching coding mode flag to be false in response to the local illumination compensation being signaled for the block, wherein frame rate up-conversion bilateral matching coding mode is determined to be disabled based on the frame rate up-conversion bilateral matching coding mode flag being derived to be false.

27. The apparatus of claim 24, wherein the processor is further configured to:
perform a first order Taylor expansion optimization to refine the motion information.

28. The apparatus of claim 24, further comprising:
a display for displaying the video data.

29. The apparatus of claim 24, wherein the apparatus comprises a mobile device with a camera for capturing pictures.

* * * * *